US007243198B2

(12) United States Patent
Berkowitz et al.

(10) Patent No.: US 7,243,198 B2
(45) Date of Patent: Jul. 10, 2007

(54) METHOD AND SYSTEM FOR TRANSPORTING DATA CONTENT ON A STORAGE AREA NETWORK

(75) Inventors: Brian Thomas Berkowitz, Seattle, WA (US); Catharine van Ingen, Bellevue, WA (US); Charles E. Park, Bellevue, WA (US); Norbert Paul Kusters, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 112 days.

(21) Appl. No.: 10/903,278

(22) Filed: Jul. 30, 2004

(65) Prior Publication Data

US 2005/0004979 A1    Jan. 6, 2005

Related U.S. Application Data

(63) Continuation of application No. 10/072,126, filed on Feb. 7, 2002, now Pat. No. 6,826,666.

(51) Int. Cl.
    *G06F 12/16* (2006.01)
(52) U.S. Cl. ...................... 711/162; 709/213
(58) Field of Classification Search ............... None
    See application file for complete search history.

(56) References Cited

U.S. PATENT DOCUMENTS

| 5,435,004 | A | 7/1995 | Cox et al. |
| 5,751,997 | A | 5/1998 | Kulick et al. |
| 5,819,310 | A | 10/1998 | Vishlitzky et al. |
| 6,035,412 | A | 3/2000 | Tamer et al. |
| 6,078,932 | A | 6/2000 | Haye et al. |
| 6,175,904 | B1 | 1/2001 | Gunderson |
| 6,253,366 | B1 | 6/2001 | Mutschler, III |
| 6,366,987 | B1 | 4/2002 | Tzelnic et al. |
| 6,385,626 | B1 | 5/2002 | Tamer et al. |
| 6,532,527 | B2 | 3/2003 | Selkirk et al. |
| 6,618,794 | B1 | 9/2003 | Sicola et al. |
| 2001/0016904 | A1 | 8/2001 | Hall |
| 2002/0019920 | A1 | 2/2002 | Reuter et al. |
| 2002/0087672 | A1 | 7/2002 | Milligan et al. |
| 2002/0091710 | A1 | 7/2002 | Dunham et al. |
| 2003/0131278 | A1 | 7/2003 | Fujibayashi |

OTHER PUBLICATIONS

*Microsoft Windows 2000 Server Operating System: Developing Hardware Snapshot Providers for Whistler* (White Paper, Updated for Whistler Server Beta 3).

*Primary Examiner*—Gary Portka
(74) *Attorney, Agent, or Firm*—Merchant & Gould P.C.

(57) ABSTRACT

A system and method of transporting volumes of information from one host computer system to another using point-in-time copies of LUNs but wherein the hardware provider does not necessarily understand the volume configuration of the data. The system and method involves an intermediate layer, i.e., a point-in-time copy interface layer that communicates with both a requesting host computer system and a hardware provider to enable the transfer of volumes of information without requiring that the hardware provider understand the volume information.

17 Claims, 10 Drawing Sheets

METHOD AND SYSTEM FOR TRANSPORTING DATA CONTENT ON A STORAGE AREA NETWORK

RELATED APPLICATION

This application is a continuation of prior U.S. patent application Ser. No. 10/072,126, entitled "Method and System for Transporting Data Content on a Storage Area Network," filed Feb. 7, 2002 now U.S. Pat. No. 6,826,666, which is hereby incorporated herein by reference in its entirety.

FIELD OF THE INVENTION

The present invention relates to storage area networks (SANs) and more specifically to the transfer of information from one host computer system to another host computer system in a SAN.

BACKGROUND OF THE INVENTION

System Area Networks (SANs) provide significant benefits as compared to other network configurations. Typical SANs are highly localized having multiple server or host computer systems communicating with each other and sharing one or more storage subsystems and possibly tape, optical or other backup media changers. Additionally, many SANs have multiple host computer systems that may be used to perform several different but complimentary functions. For example, one host computer system may be used for end-user applications while a second host computer system may be used to perform background, administration type functions such as backing up end-user application data or other system data or for performing extended query resolution on large databases of information. Using two host computer systems in such a manner significantly improves the performance of the system since the two may operate substantially in parallel.

One issue that arises when configuring a SAN to utilize two or more host computer systems to operate in parallel relates to the sharing of the data used by each host computer system. That is, the end-user host computer system may require access to a specific volume of information stored either locally on its own computer system or on a storage subsystem that is connected to the SAN. The storage subsystem may have an extensive amount of storage capabilities and may in fact provide storage for many other host computer systems in the SAN. Additionally however, the specific volume requested by the first host computer system may also be needed by the second host computer system in order to perform its functions. Such conflicts typically need to be resolved in order for both host computer systems to access the information and to operate in a more optimal manner.

Of particular concern is the case where the second computer system requires a relatively exact, read-only copy of all the data on a volume of information. A volume relates to portions of memory that have been logically combined and presented to a host computer system such that the host computer system views the volume as one portion of memory, e.g., a single disk or a single drive of information.

One solution to this problem involves the first computer system sending all the information, over the network, to the second computer system. Unfortunately however, this method significantly saturates the network and reduces the performance of the network and is therefore unsatisfactory.

A second solution to transferring information relates to the use of a "point-in-time copy" of the data, also referred to as "shadow copies" or "snapshots." Point-in-time copies are physical copies of data that are created by a storage subsystem. In essence, there are quite of few storage systems that have the capability of quickly and efficiently creating a "mirror" or a point-in-time copy of a portion of the physical storage in their respective systems. The point-in-time copy, therefore, relates to a full physical copy of information stored in another portion of the storage subsystem. Since the point-in-time copy is stored in another portion of the storage subsystem, the second computer system may be provided direct access, without conflict, to the point-in-time copy. Providing access of the point-in-time copy to the second computer system is referred to as transferring ownership of the data from the first computer system to the other computer system, i.e., transporting the content to the second machine.

Creation of a point-in-time copy is done by a storage subsystem, which is typically controlled by a hardware provider. Unfortunately however, hardware providers generally operate at the "LUN" level. A LUN is a Logical Unit Number and relates to a virtual device that is "surfaced" by the storage subsystem. A LUN may correspond to a spindle in the storage subsystem or a set of spindles. From the perspective of the host or host computer system accessing a LUN, the LUN looks like a disk which can be used to construct volumes. Hence, volumes are typically a subset of a LUN, but often, a volume may be spread over various LUNs.

Hardware surfaced point-in-time copies (i.e., copies created with the help of a hardware subsystem) results in the creation of a new LUN for each original LUN of the volume. The new LUN may be a new, full physical copy or may be an existing copy created using copy-on-write technology. Unfortunately however, transportation of data content typically occurs at the LUN level, not at the volume level. That is, although a LUN may be transported separately from the original LUN to a different machine, there is a considerable amount of work that must be done by a receiving computer system to understand what portions of the LUN are relevant, where those items are located, etc.

A common requirement for both these scenarios is to capture what the application data is (i.e., the databases, files, etc.) as well as capture the physical representation of the volumes on which that data resides (i.e., the LUNs). The LUNs and the application data (i.e., how the data is mapped onto the LUNs) need to be surfaced on the machine to which the data is transported. Unfortunately however, hardware mechanisms for creating point-in-time copies operate on the LUN level and therefore there is no way to access data based on volumes that may be spread across several LUNs. Additionally, within a SAN environment, there may be multiple storage subsystems that may be capable of creating point-in-time copies wherein each subsystem is made by different vendors. Unfortunately, in such an environment, each requestor or importer must be aware of specific hardware components for these subsystems in order to import a point-in-time copy.

It is with respect to these and other considerations that the present invention has been made.

SUMMARY OF THE INVENTION

The present invention relates to a system and method of transporting volumes of information from one host computer system to another using point-in-time copies of LUNs but wherein the hardware provider does not necessarily understand the volume configuration of the data. Indeed, the present invention relates to an intermediate layer, i.e., a point-in-time copy interface layer that communicates with both a requesting host computer system and a hardware provider to enable the transfer of volumes of information without requiring that the hardware provider understand the volume information.

In accordance with particular aspects, the present invention relates to a system having a storage subsystem module that stores data for at least one host computer system and wherein the data is generally stored in one or more LUNs. Additionally, the system has a requestor module, such a host computer system, for requesting the transportation of data stored in the storage subsystem, the transportation involving the transfer of information from a first host computer system to a second host computer system. The requesting module requests the transportation of volume of information stored on a portion of one or more LUNs. The system also has a point-in-time copy interface module for receiving the request and generating an instruction to create a point-in-time copy, wherein the instruction comprises identification information related to LUNs having portions of the volume to be copied. A provider module is also part of the system and it receives the instruction to create a point-in-time copy of the LUNs and creates the point-in-time copy of those LUNs. The provider module also provides mapping information to the point-in-time copy interface relating to location information for the point-in-time copy. Moreover, the point-in-time copy interface may further generate a backup components document describing the volume to be transported such that an importer module for importing the backup components document, and using the information in the backup components document can then access the point-in-time copy of the volume to be transported.

In accordance with other aspects, the present invention relates to a method of transporting data from a sending host computer system to a receiving host computer system, wherein the data is stored on volume of information. The method involves creating a point-in-time copy of the volume; generating a backup components document, wherein the document includes location information for point-in-time copy; importing the backup components document to the receiving host computer system; and accessing the point-in-time copy using information in the backup components document.

In another embodiment, the method relates to creating a point-in-time copy of each LUN having a portion of the volume to transported; marking portions of the LUN to identify the portions as being associated with the volume to be transported; and then hiding portions of the LUN not associated with the volume to be transported. In accordance with other aspects, the marking act marks the portions of the LUN associated with the volume and in other embodiment the marking act marks portions of the LUN that are not associated with the volume. In yet another embodiment, the method relates to transporting data in a plurality of volumes and the backup component document includes information to describe the plurality of volumes. The backup components document may be an XML document.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE PREFERRED EMBODIMENT

Figure 1:
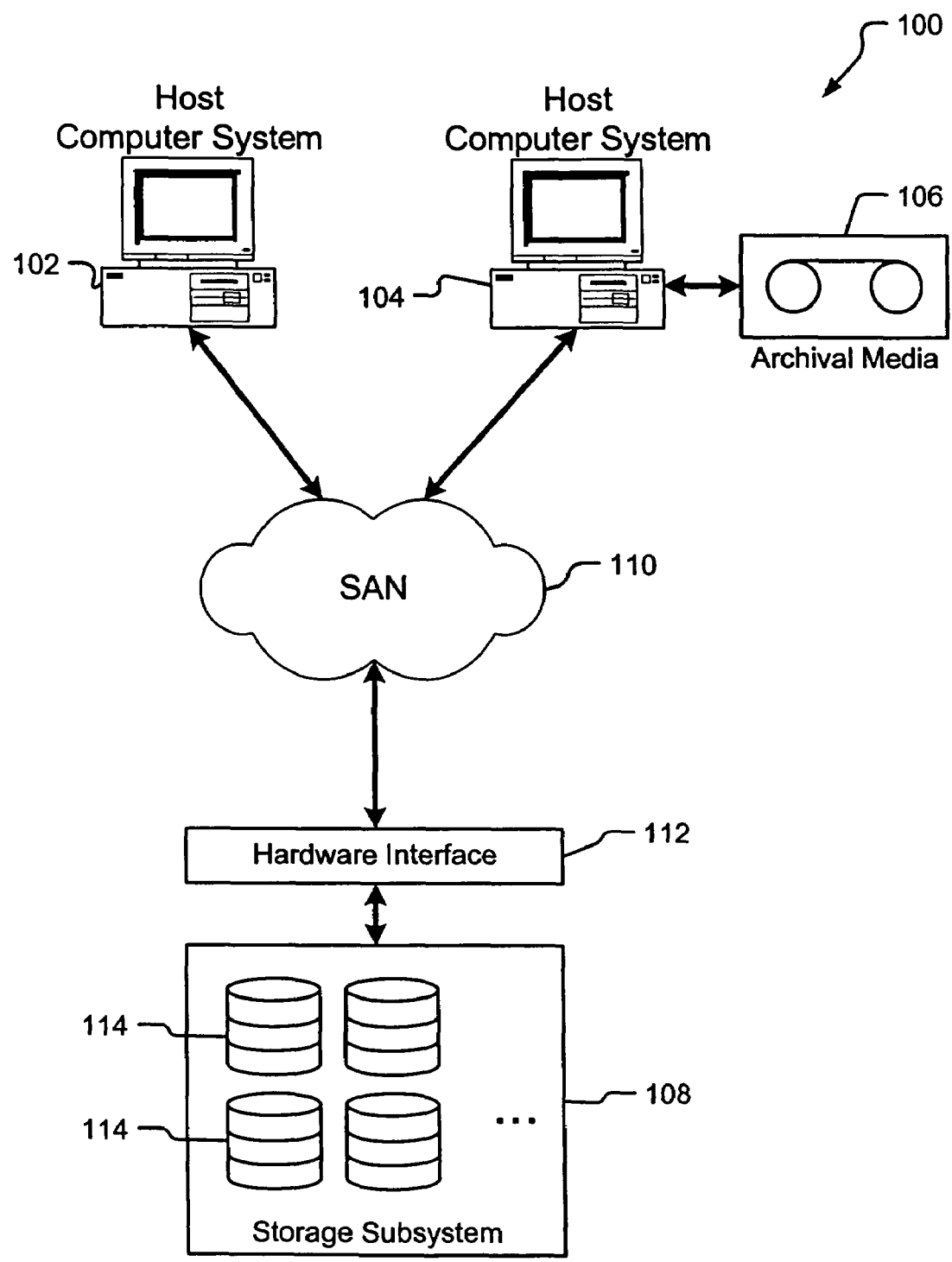
FIG. 1 illustrates a system area network that incorporates aspects of the present invention.

A distributed environment 100 incorporating aspects of the present invention is shown in FIG. 1. The environment 100 has at least one host computer system 102 and potentially other host computer systems such as 104. The environment 100 may further include an archival backup system 106 for backing up data from either the host computer system 102 or 104, as described below. Additionally, the environment may include a memory or storage subsystem, such as RAID (Redundant Array of Independent Disks) system 108. The host computer systems such as 102 and 104, communicate with the memory system 108 and each other over a network configuration such as SAN 110. SAN 110 may be a system area network, such as FiberChannel, InfiniBand, among others, that provides communication capabilities to the various components, such as host systems 102 and 104. Additionally, the SAN may provide communication support with the memory system 108 through a hardware interface 112 shown in FIG. 1. In other embodiments, environment 100 may further include many other components, such as other host computer systems, other memory subsystems, an I/O controller to provide an interface connection to other networks, such as the Internet, among others.

As stated, the memory system 108 stores information for use by one of the host computer systems 102 and 104. The memory system 108 may be any of a number of different types of memory systems. The hardware interface 112 is typically part of the memory system 108 but may be separate. The hardware interface 112 typically includes the controls for creating and maintaining a point-in-time copy of a logical unit of memory, i.e., a LUN, such as LUNs 114. Additionally, the hardware interface typically communicates with the host computer systems 102 and 104 over network 110 and is able to provide mapping information for stored data on the various LUNs. Importantly, the subsystem 108 provides the capability to create a point-in-time copy of information at the LUN level, i.e., the system can create a point-in-time copy of a LUN. The subsystem 108 may use mirror technology to create and/or maintain a point-in time copy or the system 108 may work in conjunction with the hardware interface 112 and/or the host computer systems 102 and 104 to create the point-in-time copy upon request using other technology.

In an embodiment, at least one of the host computers 102 or 104 communicates with the hardware interface 112 and provides the ability to combine portions or extents of separate LUNs into volumes. Additionally, the computer system 102 may map more than one complete volume to a single LUN. Therefore, applications running on the host computer systems may operate based on volumes of information, which may be larger or smaller than the particular LUN for the given memory system 108.

In essence, one of the host computer systems, such as system 102 requests the creation and/or transportation of one or more volumes of information. Once requested, another process within the same computer system, or potentially a process within another host computer system, determines which LUNs need to be copied and which portions of those LUNs need to be transported or surfaced on the receiving system, such as system 104. Using this information, the memory system 108 is instructed as to which LUN(s) to copy. Upon receiving the copies of the LUN(s), the necessary portions of the various LUN(s) are combined with reconstruction mapping information as well as any other information that the receiving system requires in order to use the copy of the volume. Once surfaced on the second computer system 104, system 104 can use the point-in-time copy to perform backups, query resolution or substantially any other function that requires a copy of a volume of information:

As an example, an application operating on a first host computer system 102 may request the transfer of its data to another system 104 to be backed up onto archival media 106. Upon receiving the request, the system 108 creates a point-in-time copy of two LUNs. The volume of information actually required in this example however, only needs portions of each of the two LUNs. The system 108, only operating at the LUN level, provides copies of both LUNs to the requesting system. The requesting system packages the two LUNs for transport by creating a self-contained description of the application data including where that data resides, how that data is to be restored, and the description of what physical resources need to be brought on line to get to the application data.

The receiving system 104 receives the self-contained description and is able to reconstruct all the elements of the volume including the mapping from the original volume to the copied volume even after the copied volume is transported to another machine. Additionally, only those volume(s) that were requested for transport are surfaced on the receiving machine. For example, suppose several volumes are created on a single LUN and only one of them is requested for copy and transport. Since the entire LUN is copied, the portions that are not part of the volume are marked as hidden such that when the point-in-time copy is imported on the receiving system 104, only the requested volume is surfaced. The other volumes, although they appear on the LUN, remain hidden.

Figure 2:
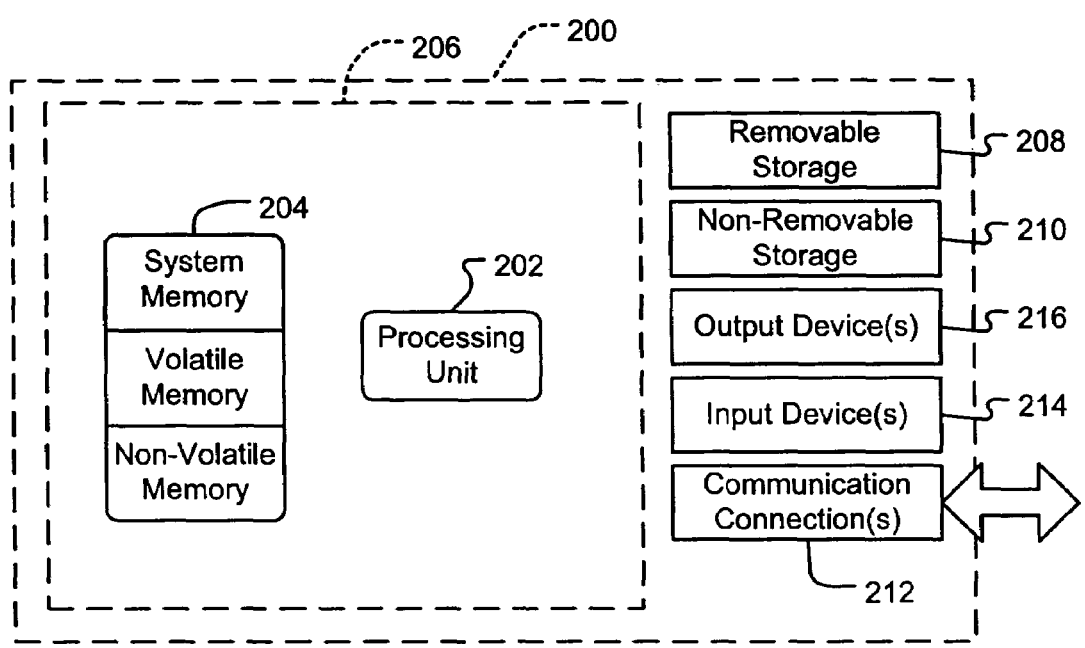
FIG. 2 illustrates a computer system that may be used according to particular aspects of the present invention.

A computer system 200 that may represent one of the host computer systems, such as 102 shown in FIG. 1, which communicates with other host computer systems, such as system 104 through the network fabric 110 in accordance with the present invention, is shown in FIG. 2. In its most basic configuration, computing system 200 is illustrated in FIG. 2 by dashed line 206. The system 200 has at least one processor 202 and a system memory 204. In other embodiments, the system may have more than one processor.

In addition to the components illustrated as 206, the system 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200. Depending on the configuration and type of computing device, memory 204 may be volatile, non-volatile or some combination of the two.

System 200 may also contain communications connection(s) 212 that allow the device to communicate with other devices, such as other the other host computer system 104, or the RAID System 110 shown in FIG. 1. Additionally, system 200 may have input device(s) 214 such as keyboard, mouse, pen, voice input device, touch input device, etc. Output device(s) 216 such as a display, speakers, printer, etc. may also be included. All these devices are well known in the art and need not be discussed at length here.

Computer system 200 typically includes at least some form of computer readable media. Computer readable media can be any available media that can be accessed by system 200. By way of example, and not limitation, computer readable media may comprise computer storage media and communication media. Computer storage media, as described above, includes volatile and nonvolatile, removable and non-removable media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
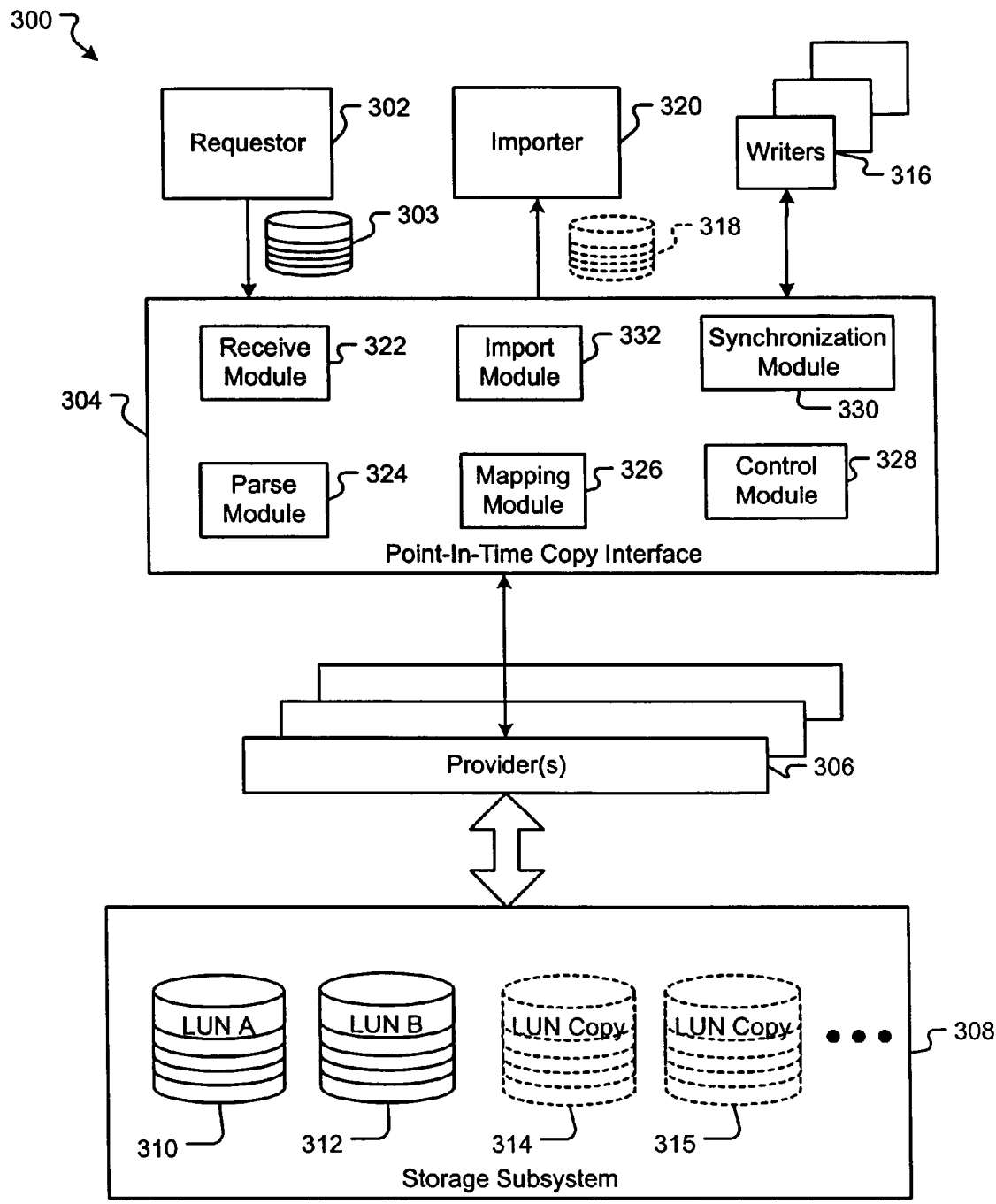
FIG. 3 is a block diagram illustrating functional components of the system area network shown in FIG. 1 and incorporating aspects of the present invention.

FIG. 3 illustrates a software/hardware environment 300 incorporating aspects of the present invention. The environment 300 includes separate modules that perform functional operations in accordance with those aspects. The modules may be operate solely within one computer system, such as system 200 shown in FIG. 2 or the modules operates in a distributed manner across more than one computer system. The environment 300 includes a requestor module 302 that requests that a point-in-time copy of a volume, e.g., volume 303, be created.

In an embodiment, the requestor module 302 relates to a computer application or process that requests that one or more point-in-time copies to be made of one or more original volumes. In one particular embodiment, the requestor 302 is a backup application program that is used to store a copy of original volumes onto another disk or medium. As shown in FIG. 3, the requestor module 302 communicates a request to the point-in-time copy interface 304. The request may include one volume to copy or the request may include multiple volumes. In one embodiment, the requestor 302 also requests that the copy be made available for transport across the network, yet in other embodiments, the network may automatically prepare the copy for transport.

Although described as single request, in a particular embodiment, the requestor module 302 may make a first request to establish a set of volumes to be copied. In return the point-in-time copy interface 304 may return a unique identifier, such as a GUID (global unique identifier). The requestor module 302 may then send multiple messages indicating which volumes should be added to the set identified by the GUID. Following the addition of volumes to the set, the requester module 302 initiates the copy process. Typically, the set is fixed at the invocation of copy process, such that new volumes cannot be added later. In a particular embodiment, only 64 volumes may be included in the point-in-time copy set. However, in other embodiments, there are no limits on the number of volumes that may be included in a particular set or the number of copies of an original volume that may be requested.

Additionally, the requestor application 302 may include one or more writer modules, such as writer modules 316. In such an embodiment, the writer module actually interacts with the point-in-time copy interface 304 in order to create a snapshot. The writer is responsible for quiecing writes to a data store used by the requestor 302 for the period of time that the point-in-time copy is actually materialized. In addition, the writer interacts with other requestor modules (not shown) to describe what is to be copied, e.g., backed up, as well as annotate a backup components document to facilitate the restoration of data that is copied. Exemplary writer modules may include a SQL Server Writer. With respect to the SQL Server Writer module, it will cause the storage system to quiesce writes for the period between "freeze" and "thaw", i.e., the time periods before a point-in-time copy is created and after the point-in-time copy is created, respectively.

The request made by requestor 302 is conducted to point-in-time copy interface module 304. In an embodiment, the interface module 304 is on a host computer system, such as system 102 or 104 or distributed throughout the system 100 shown in FIG. 1. The point-in-time copy interface module 304 receives the request, parses the request and then instructs a provider 306 to create a point-in time copy. The interface module, in an embodiment, provides a layer of abstraction between the provider 306 and requestor 302 such that the provider 306 is not required to understand volumes or other concepts used by the requestor 302. In essence, the point-in-time copy interface intercepts requests from the requester and instructs the provider accordingly.

The point-in-time copy interface layer 304 also constructs a backup metadata document based on information provided by the requestor (and potentially by the writer). As part of the document, the layer 304 includes a point-in-time copy description based on the original set of volumes and information received from a provider 306 as to the set of LUN copies created for each point-in-time volume copy.

The provider 306 receives instructions from the point-in-time copy interface 304 to create a point-in-time copy. Upon receipt, the provider 306 communicates with a storage subsystem 308 to actually create a point-in-time copy of at least one LUN. In essence, the storage subsystem 308 may have several physical disks that may be logically divided into separate units, each having a unique number, such as LUNs 310 and 312. The provider causes the system 308 to create at least one copy of one or more particular LUNs, such as copies 314 and 315. The provider 306 may describe the mapping between the set of LUNs for each original volume in a point-in-time copy set as well as the copies of the LUNs created for each point-in-time volume copy. Additionally, the provider 306 may further assist in surfacing LUN copies when those copies are transported to another computer system.

In a particular embodiment, the provider 306 is a hardware provider consisting of a user-mode component that works in conjunction with a hardware storage adapter or external storage subsystem 308 and intercepts access requests, e.g., I/O requests in hardware. Importantly, the provider 306 controls the subsystem to generate the point-in-time copy of a LUN. Typically, hardware providers implement the at least two interfaces, such as "IVssProviderCreateSnapshotSet" and "IVssHardwareSnapshotProvider" interfaces. The first interface is common to all providers and implements the snapshot state sequencing. The second interface is specific to hardware providers and operates on a LUN abstraction. More details of these and other interfaces that may be implemented, along with methods that may be used in accordance with one embodiment, are detailed in the attached Appendix A.

Additionally, providers 306 may be implemented as COM components and called out-of-process by the layer 304. Providers 306 use provider-specific mechanisms to communicate with the host adapter or external RAID storage subsystem that instantiates the snapshot LUNs. In using the providers 306, there may be no need for any extra kernel mode components to perform the control of the storage subsystem 308.

Hardware providers 306 may support copy-on-write or plex (full mirror copy) copy techniques. Hardware providers 306 support transportable point-in-time copies to allow movement between different computer systems on the SAN.

Prior to the actual copy process, the original LUNs may be accessed by a number of different modules, such as writers 316, which can read and write information from and to the different LUNs. Writers 316 correspond to other processing modules that may be connected to the network, apart from the requestor 302. In one embodiment, during the actual copy process the original LUNs 310 and 312 cannot be accessed by the writers 316. In other embodiments however, the original volumes are always visible to the system and can be written to, yet most writers quiesce writes during the freeze and thaw periods to ensure consistency, although this is not required. The process of synchronizing various read and write access requests is discussed in more detail in the U.S. patent application Ser. No. 09/912,615, filed Jul. 24, 2001, entitled SYSTEM AND METHOD FOR BACKING UP AND RESTORING DATA, incorporated herein by reference for all that it discloses and teaches, filed concurrently herewith, and assigned to the Assignee of the present application.

Once the copy of the required LUN or LUNs is made, information is provided to the point-in-time copy interface module 304 indicating that the copy has been made as well as other information such as the location or access information for the copies. The module 304 combines the received information with mapping and other application data prior to transporting the information to a second computer system. In essence, the module 304 combines LUN information, along with any mapping information to create a volume, such as volume 318, which represents a copy of the requested volume 303. The volume 318 is then "surfaced" on an importer module 320.

The importer module 320 relates to computer process or application that resides, at least in part, on a computer system apart from the computer system housing the requestor module 302. Thus, the information has been effectively transported from one machine housing the requester 302 to a different machine, housing the importer module 320. Once imported, the importer may reconstruct the volume and perform backup or other functions using the imported volume 318. Although the volume is considered to be transported, the actual physical information may remain on the storage subsystem 308, such that the "transportation" process merely involves passing location, access, and ownership information and capabilities from one computer system to another. Once transported, the importer module may access and use the information in the transported volume to perform required functions, such as backup or query process functions.

In one embodiment, the point-in-time copy interface 304 uses separate modules to perform various tasks. For instance a receive module 322 may be used to receive the request from the requestor 302. Additionally, the receive module 322 may perform other functions such as general communication between the interface 304 and the requestor 302 or the importer module 320 or the various writers 316.

The interface layer 304 may further include an import parse module 324 for parsing a request. The act of parsing a request may determine whether the request is for creating a point-in-time copy, importing a point-in-time copy, among others. The parse module 324, in an embodiment works in conjunction with a mapping module 326 to determine and maintain information related to volumes and how the volumes are mapped to separate LUNs located on the storage subsystem. The mapping module 326 provides the level of abstraction between a requestor 302 and a provider 306 such that the requestor can supply requests with respect to volumes without knowledge of how that information is mapped into the LUNs. Similarly, the mapping module 326 allows the provider 306 to send and receive information based on the LUNs, without knowledge of volumes or how the volumes are mapped into the LUNs.

The interface layer 326 may further include a control module 328. The control module, in an embodiment, controls the interaction between various modules and may further control timing and sequencing of events. For instance, the control module 328 may operate in conjunction with a synchronization module 330 to synchronize memory access requests originating from multiple processes, such as writers 316, requestor 302 and importer 320. Synchronizing these requests, and potentially pausing various requests, allows the providers 306 to create point-in-time copies without conflicts or missed updates.

An import module 332 may be incorporated into the point-in-time interface 304. The import module 332 packages information received from the providers relating to the location of a physical copy on storage subsystem 308. Using this information, the import module generates a self-contained description of the information to be surfaced on the importer 320, as well as any other information such as where the information resides, what other processes should be activated in order to access the information, etc. Typically, the import module 332 may be located on a separate computer system from the requestor module 302, e.g., the requestor module may be located on the host computer system 102 (FIG. 1) and the import module 332 may be located on the host computer system 104 (FIG. 1). However, in alternative embodiments, the import module 332 may be located on the same computer system as the requester module 302, e.g., both modules 302 and 332 may be located on system 102 or system 104 (FIG. 1).

Using these modules essentially two primary functions are performed by layer 304. First, the function of constructing the point-in-time copy and mapping LUN information needed for importing the point-in-time to another machine is performed. Typically this is done on the host machine where the original volumes reside since the mapping is created when the original volumes are snapshotted. Second, the import module 332, takes in this description and interacts with the provider to expose the point-in-time copy LUNS that correspond to the volumes on the original LUNS.

In alternative embodiments, the interface 304 has many other modules, such as a module (not shown) that specifically provides communication control between the providers 306 and the other modules of the interface 304, for example.

Figure 4:
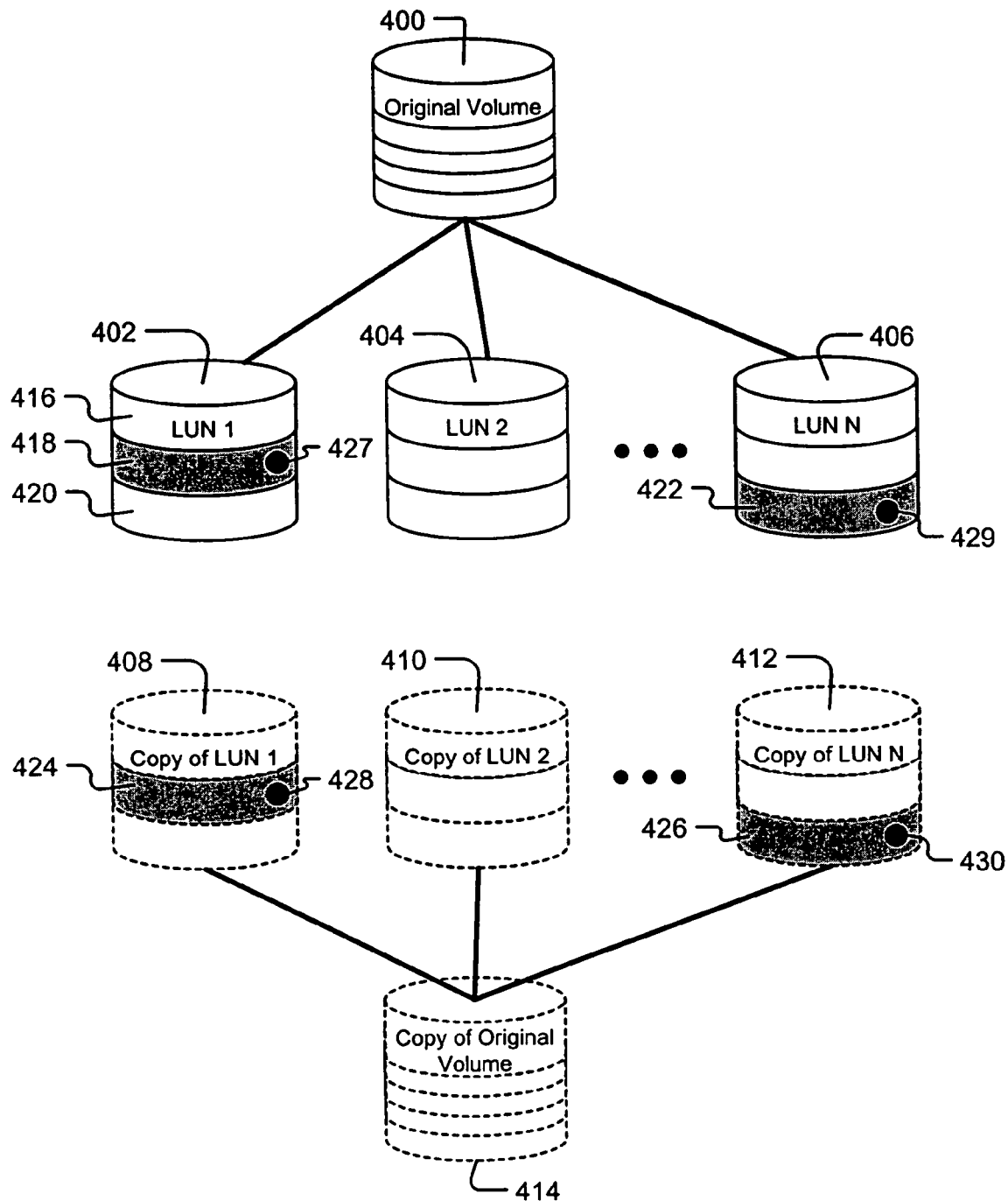
FIG. 4 illustrates a logical depiction of a volume spread across multiple LUNs and a point in time copy of the volume.

As described above, a volume may be wholly located on a single LUN, or on a portion of LUN, or on portions of several LUNs. FIG. 4 illustrates the concept of spreading an original volume 400 across several LUNs 402, 404, and 406. In the example shown in FIG. 4, original volume 400 relates to a logical unit of memory as viewed by a host computer system, such as system 102 shown in FIG. 1. The host computer system 102 may or may not understand the mapping of original volume 400 across the several LUNs. In many cases, the host computer system understands LUNs and volumes but the applications running on the host computer system typically do not understand or operate in terms of LUNs. Instead the applications operate on files in a file system that is implemented on top of a volume (which may be composed of portions of one or more LUNS), i.e., a portion of continuous memory space known as volume 400. The interface layer 304 (FIGS. 1 and 3 respectively) provides mapping functions to spread the volume across the various LUNs.

FIG. 4 also illustrates a point-in-time copy of LUNs 402, 404 and 406, that is, copies 408, 410 and 412. The copies 408, 410, and 412 are actual physical copies of the various LUNs on the subsystem 308. In an embodiment, there is a copy of each LUN on the subsystem, but in other embodiments, only a predetermined number or set of LUNs are copied at a time. Maintaining mapping information from the original LUN and how it relates to the various LUNs 402, 404, and 406 provides the ability to reconstruct or generate a copy of original volume 400, i.e., copy 414. The copy of the original volume 414 is effectively surfaced on a second computer system, such as system 104 shown in FIG. 1.

The LUNs, such as LUN 1 402, LUN 2 404 and LUN N 406 exemplify the numerous LUNs present on a storage subsystem. Each LUN comprises multiple portions or extents, such as portions 416, 418 and 420. Of course, there may be many other portions included in a particular LUN. When copies of the LUNs 402, 404 and 406 are created, all the portions of the LUN are copied into the point-in-time copy. Sometimes, portions of a LUN are copied but are not necessarily part of the original volume 400 and are therefore not part of the copy of the original volume 414.

As an example, assume that volume 400 is mapped to the three volumes 402, 404 and 406. However, in this example volume 400 does not include portions 418 on LUN 1 402 or portion 422 on LUN N 406. When a point-in-time copy is created, all portions of each LUN is copied, including portions 418 and 422, which correspond to portions 424 and 426 on copies 408 and 412, respectively. However, prior to creating the point-in-time copy, the portions 418 and 422 are marked to indicate that these portions should be excluded from the copy of the original volume 414. The actual markings on 418 and 422 are represented by marks 427 and 429. Following the actual point-in-time copy process, since the process copies the LUNs relatively exactly, the markings 427 and 429 appear on the extents 424 and 426 of LUN copies 408 and 412. The actual markings on 424 and 426 are represented by marks 428 and 430. The markings 428 and 430 provide the necessary information to indicate that these extents 424 and 426 should be hidden or removed from the copy of the original volume 414. The types of markings may vary, but the interface layer, such as layer 304 shown in FIG. 3 recognizes the markings so as to exclude the portions.

In an embodiment, the provider 306 in conjunction with the subsystem 308 provides the state necessary to support not only the access to volumes on point-in-time copy but also the tagging or marking of a portion of a LUN as read-only and/or hidden. The state is on the hardware LUN and travels with the LUN. Moreover, the state is preserved across boot epochs and/or device discovery. In a particular embodiment, the layer 304 manages the state of these read-only or hidden portions.

Figure 5:
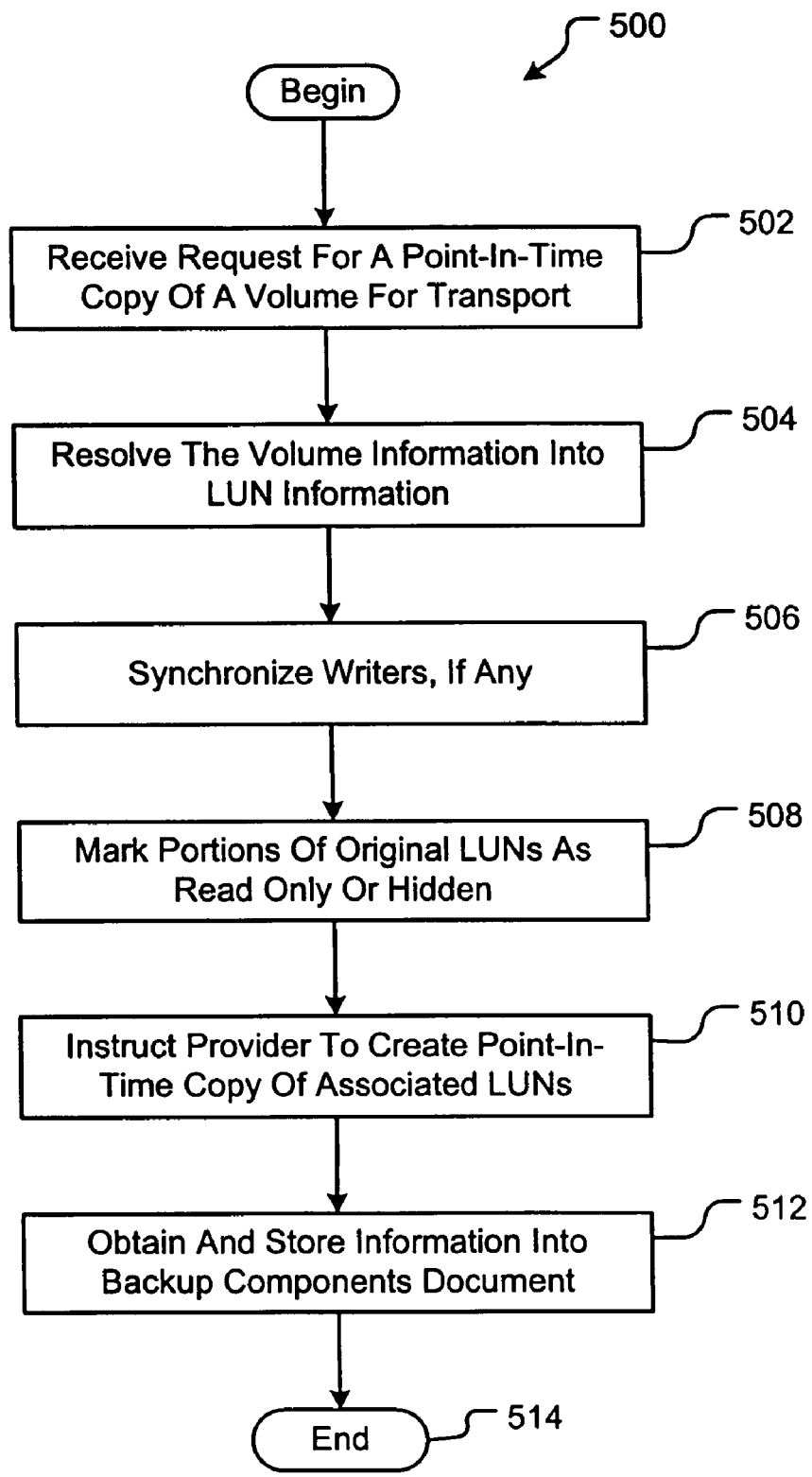
FIG. 5 illustrates a high-level flow chart of functional operations related to the creation of a point-in-time copy that may be transported according to aspects of the present invention.

FIG. 5 illustrates the functional components related to requesting and creating a transportable volume or set of volumes. Flow 500 generally relates to the process performed by the layer 304 shown in FIG. 3. Flow 500 begins as receive operation 502 receives a request for a point-in-time copy of a volume for transport. As discussed above, a requestor module, such as module 302 shown in FIG. 3, may generate the point-in-time copy request and send the request to the layer 304. The request may include a single volume or multiple volumes in a set. The request may further include an indication that the new point-in-time copy should be transportable, such as by including a "transportable" attribute. Additionally, the request may comprise a plurality of communications, such as a request to begin adding volumes to a set, adding those volumes to the set, and then submitting the set to be copied.

Once receive operation 502 receives the request to create a point-in-time copy for a volume or a set of volumes, resolve operation 504 resolves mapping of volume information into LUN information. In the case where multiple volumes are being copied, in an embodiment, the resolve operation 504 may begin resolving volume/LUN mapping information as it receives each volume, without waiting for the remaining volumes. In alternative embodiments however, resolve operation may wait until all volumes have been requested.

Resolve operation 504 determines which LUNs are required to be copied. In an embodiment, the resolve operation may communicate with the one or more providers 306 to determine whether the requested LUNs are supported, and which provider supports those particular LUNs. With respect to hardware providers, the provider is presented with the information about the set of LUNs used to construct the volume and the hardware provider returns an indication as to whether the volume is supported or not by indicating whether those LUNs are supported. This determination should be all or nothing, i.e., if one LUN is not supported then the volume cannot be copied. Also, in an embodiment, the same hardware provider must support all LUNs contributing to a specific volume. In this embodiment, the hardware provider may also augment any LUN information that may be useful to either the requestor or the interface layer, such as layer 304. For example, the LUN information may be augmented with an interconnect address or the like.

Following the resolution of volume and LUN information operation 504, synchronize operation 506 communicates with various other writers, if there are any, that a point-in-time copy is going to be created. Synchronize operation may simply instruct other writers to stop writing and wait a predetermined time period to allow existing access requests to complete before proceeding. In other embodiments, other methods may be used to effectively communicate with the writers such that the writers do not attempt to access or modify a volume of information while a copy is being made. Preventing access during the actual copy process eliminates issues of missed updates or inaccurate point-in-time copy information.

Additionally, during the synchronize writers operation 506, an indication may be sent to a provider that a point-in-time is going to be requested. That is, the hardware provider supporting the LUNs of the volume to be copied is notified that a copy of the volume is to be made and which LUNs should be copied. However, the notification indicating an upcoming point-in-time copy operation allows the provider time to prepare for the actual point-in-time copy process.

Following synchronize operation 506, mark operation 508 marks, in one embodiment, all volumes on all LUNs that are being copied as hidden and read only. In alternative embodiments, portions of original LUNs that are not associated with requested volumes may be uniquely marked. The hardware provider exposes marking capability relating to read-only or hidden portions of LUNs. Using this capability, mark operation marks unassociated LUNs as hidden. In other embodiments, other methods may be used to identify those portions of LUN copies that are not associated with a volume to be transported. In some cases, however, a requested volume may be placed entirely on one or more LUNs such that each portion of each LUN copy is associated with a copied volume. In such a case, mark operation 508 may not be necessary. That said, however, the mark operation 508 may be necessary for other reasons. For example, the mark operation 508 may be used to mark the point-in-time volumes as read only. Additionally, the import algorithm discussed below in conjunction with FIG. 8 relies on looking for volumes marked as hidden in order to find the point-in-time volumes such that mark operation 508 may be necessary when implementing such a search algorithm.

Mark operation 508 occurs prior to the creation of a point-in-time copy, e.g., operation 510 discussed below. The purpose of this requirement is that most storage subsystems do not allow the marking or modification of a point-in-time copy once it has been created. Thus, the original volumes that are affected are marked as read-only and hidden which will cause all copied volumes that are surfaced on the receiving machine as read-only and hidden. The mark or tag may be implemented using hidden sectors on MBR (Master Boot Record) disks or operating system software specific bits in the partition header entry on GPT (GUID Partition Table) disks. When marking occurs before the creation of the point-in-time copy, then the markings carry over once the copy is made, such that point-in-time copies will include the proper markings. Additionally, an extra step of removing the markings from the original volumes may also be required in this case.

Figure 6:
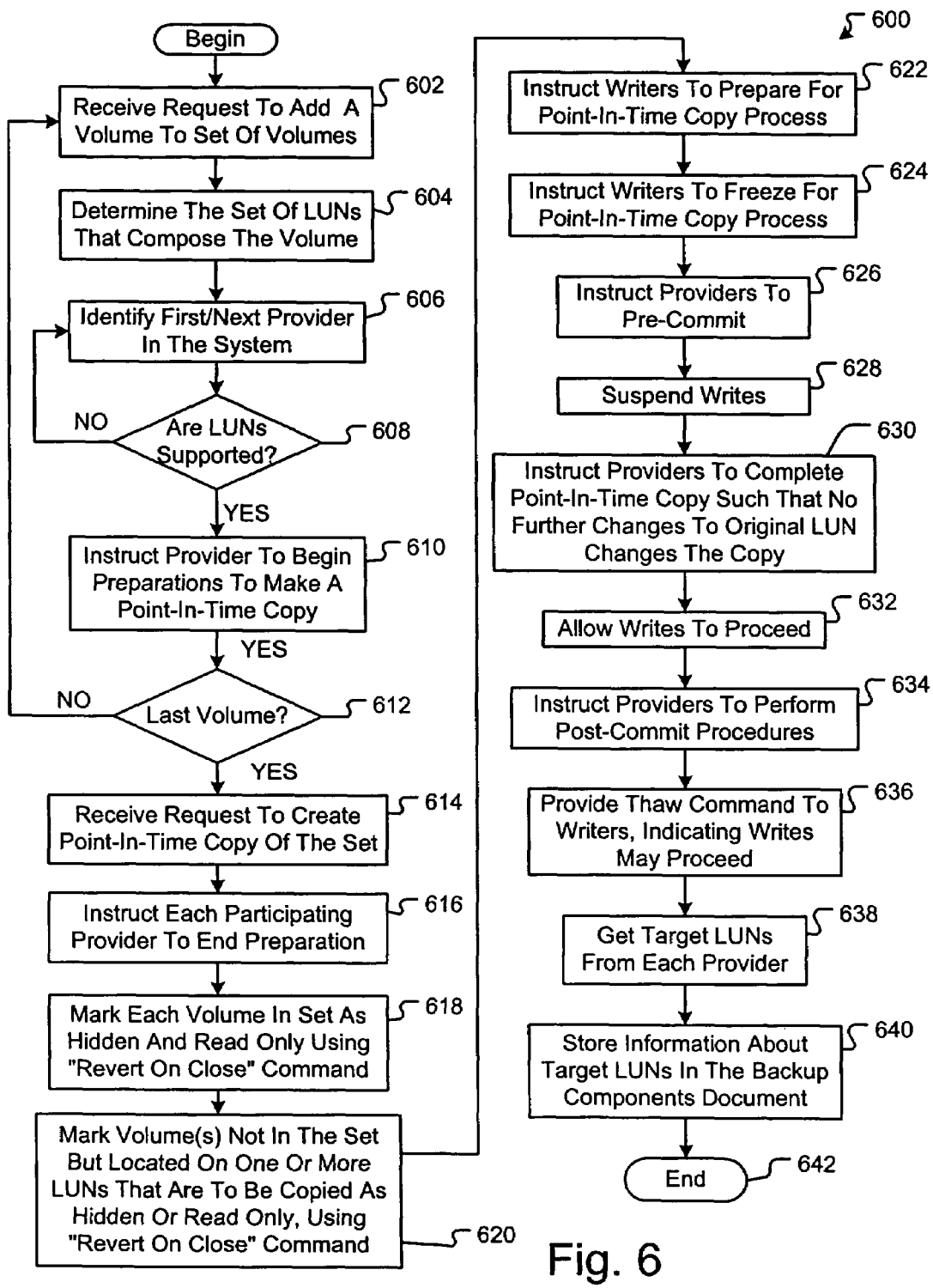
FIG. 6 illustrates a more-detailed flow chart of functional operations related to the actual creation of a point-in-time copy of a set of volumes in accordance with a particular embodiment of the present invention.

Upon completion of mark operation 508, instruct operation 510 instructs the provider to create the point-in-time copy of the associated LUNs. Essentially, instruct operation 510 relates to the actual creation of the point-in-time copy of the LUNs associated with requested volume. Instruct operation 510 may comprise a series of different acts as discussed below in conjunction with FIG. 6. Following instruct operation 510, the actual point-in-time copies of the associated LUNs exist on the subsystem, such as system 308 shown in FIG. 3.

Once the instruct or copy operation 510 has completed, obtain and store operation 512 obtains information from the hardware provider relating to the point-in-time copy set, including the copied volumes, LUN mappings and information as to how the volumes are located on the LUNs. The hardware provider is sent information relating to the original volume and requested to construct corresponding information related to the point-in-time copy of the LUNs. Upon obtaining the information, operate and store operation 512 stores the information into a backup components document, such as the sample document shown below in Appendix B. In an embodiment, the document is an XML document containing original LUN information, new point-in-time copy LUN information and identifications for the disk extents for each volume in the point-in-time copy set. The backup components document may then be used at a later time to surface the copied volumes on the second machine. In one embodiment, a surfaced or exposed point-in-time copy is accessible in the Microsoft WINDOWS® operating system namespace via drive letter, mount point, volume device name, and/or network share.

With respect to a particular embodiment, in order to keep track of the mapping from the original volume to the point-in-time copy volume, a "SNAPSHOT_SET_DE-SCRIPTION" XML element appears in the backup components document and describes all properties of a point-in-time copy set (i.e., a set of volumes copied at the same point in time). In particular, it contains information about the physical layout of the original volumes as well as the physical layout of the snapshot volumes. Additionally, the physical layout of the volumes is described in terms of a "LUN_MAPPING" XML element. There is an array of LUN_MAPPING elements for each volume in the point-in-time copy set. The LUN_MAPPING element consists of three components, e.g., a source "LUN_INFORMATION," target "LUN_INFORMATION," and a "DISK_EXTENT" array. The source LUN_INFORMATION describes the physical characteristics of the original LUN, the destination LUN_INFORMATION describes the physical characteristics of the destination LUN, and the DISK_EXTENTS describes what contiguous portions of the original LUN are occupied. The LUN_INFORMATION contains enough information to identify the LUN and includes such information as the product id, serial number, vendor identification, as well as addressing information used to find the LUN on the SAN.

The SNAPSHOT_SET_DESCRIPTION is built by snapshot service with cooperation from the snapshot provider and is stored in the backup components document. When the requestor (for example the backup application) requests that the point-in-time copy be surfaced on another machine, the SNAPSHOT_SET_DESCRIPTION is extracted from the backup components document and is used to obtain access to the target LUNS as well as reconstruct the mapping from the original volumes to the point-in-time copy volumes that are surfaced. The mapping is generally necessary to find where a corresponding file (as specified in the backup components document) on the original volume is to be found on the point-in-time copy volume.

In a particular embodiment, the creation of a point-in-time copy relates to the creation of a point-in-time copy set, which involves copying multiple volumes. Thus, a point-in-time copy set relates to more than one volume of information being copied relatively simultaneously, i.e., each volume copy of the point-in-time set having the same point-in-time characteristic. The layer 304 (FIG. 3) manages the process of creating a point-in-time copy set, the process shown in FIG. 6.

Initially, flow 600 begins as receive operation 602 receives a request to add a volume to the set of volumes. As discussed above, the requestor module, e.g., 302 (FIG. 3) may request that more than one volume be included in the point-in-time copy process. In one embodiment, the requestor sends a command to the interface layer 304 indicating that a set of volumes are to be copied. In such a case, the requestor then receives multiple requests, each indicating that a new volume is to be added to the set, and which volume to add to the set. Operations 602 through 612, described below, relate to the acts involved with establishing the set of volumes to be included in the point-in-time copy.

Upon receiving a request to add a new volume to the set of volumes 602, determine operation 604 determines the set of LUNs that are used to compose that new volume. The information may be gleaned from information describing the volume or referenced elsewhere in the system. In an embodiment, the LUNs are determined by calling a module, such as IOCTL_VOLUME_GET_DISK_EXTENTS, which invokes the volume manager to describe which drives are used and which ranges of bytes on each drive are used. There is a one-to-one mapping between physical drives (as seen by the operating system) and LUNs (exposed by the storage subsystem).

Next, the first hardware provider is identified at identify operation 606. Using the LUN identification information determined at operation 604, the first hardware provider is asked whether that hardware provider supports those LUNs at ask operation 608. i.e., operation 608 determines whether the identified provider supports the LUNs for the new volume being added to the set of volumes. In an embodiment, the provider is called using "AreLunsSupported"

wherein the call includes the set of LUNs. The provider returns an indication as to whether it can create a point-in-time copy for all the LUNs identified in the call.

If the provider can create a point-in-time copy of all the LUNs identified in the call, then the provider will return an indication to that effect. In such a case, flow 600 branches YES to instruct operation 610. Instruct operation 610 instructs the provider to begin preparations for those LUNs to be involved in a point-in-time copy process. In one embodiment, instruct operation 610 calls the provider with "BeginPrepareSnapshot", wherein the set of LUNs is also provided in the call. It is contemplated that at this point, the hardware provider should begin the process of creating the snapshot or point-in-time copy. In particular, the provider may respond to the call by allocating resources for the point-in-time copy and by doing any work that can be done in advance of point-in-time copy creation. Typically, for a provider that supports mirrors, the provider should create a mirror and begin syncing the mirror, especially if a mirror does not already exist for each LUN.

Although it is contemplated that the hardware provider may begin doing work to prepare for the point-in-time, in alternative embodiments, the instruct operation 610 may simply provide an indication that at some point a point-in-time copy process will be conducted and the provider will be involved. Depending on the hardware provider, such an indication may or may not be used to perform any number of activities in order to adequately prepare for the point-in-time copy process.

However, if the provider cannot create a point-in-time copy of all the LUNs in the call, then flow 600 branches NO back to identify operation 606 which identifies the next hardware provider. If the next provider can create a point-in-time copy of all the LUNs in the call then flow will branch YES to instruct operation 610. However, as above, if the next provider cannot support the LUNs, then flow 600 will branch again back to identify operation 606. In essence, each of the various providers may be called in order to determine which one supports the LUNs associated with the new volume. If no provider is located that can create a snapshot for all the LUNs in a particular volume then that volume is not added to the set. Essentially, if no hardware provider, such as providers 306 (FIG. 3) is found, then a software snapshot provider is used instead. However, since software providers will not support transportable snapshots, the outcome is the same, i.e., if no hardware provider is found, then the point-in-time copy will not be able to be made on that volume. Additionally, the requestor is notified of that the volume has not been added to the set.

In one embodiment, a singular provider must support all LUNs in the call in order for the volume to be added to the set. In alternative embodiments however, volumes may be split across different providers. However, it should be noted that such an embodiment requires additional processing to handle the situation where one provider succeeds at one step in the process but another provider fails. The interface layer 304 may communicate with the various providers to handle such a situation.

Following instruct operation 610, determine operation 612 determines whether there is another volume to evaluate. In essence, operations 604 to 610 repeat for each volume that is to be added to the set. When another volume is to be added to the set, flow branches NO back to receive operation 602. However, when there are no more volumes to be added to the set, then flow branches YES to receive operation 614. The requester, such as requestor 302 (FIG. 3) may control whether there are more volumes to be added to the set.

Hence, when no more volumes are to be added to the set, the requestor may send a "close volume set" command or might send a request to create the point-in-time copy. Alternative embodiments may include other means by which to indicate that no more volumes are to be added to the set.

Once all the volumes have been added to the snapshot set, then receive operation 614 receives a request to create the point-in-time copy set. In an embodiment, the requestor indicates that the point-in-time copy set should be created.

In order to create the point-in-time copy set, each provider participating in the point-in-time copy set is called with a command to end preparations at call operation 616, such as with an "EndPrepareSnapshots" command. In an embodiment, this command tells the provider that it should be ready to create snapshots for each LUN that it had previously received in a BeginPrepareSnapshot call at a moments notice. If the provider is syncing mirrors, then the mirrors must be completely synced before this call returns.

Following call operation 616, mark operation 618 marks each original volume in the set as hidden and read-only. Similarly, if multiple volumes are on the LUN, then mark operation 620 marks all other volumes as hidden and read only. It is important that the marking process occurs prior to the creation of the actual point-in-time copy since typically, once the point-in-time copy is created, the point-in-time copy LUNs are not visible to the system and cannot be modified.

The purpose of steps 618 and 620 relates to the ultimate goal of having the point-in-time copy volumes marked as hidden and read-only. In order to achieve this goal, the process takes advantage of the fact that the point-in-time copy volumes are relatively exact copies of the original volumes at the time that the point-in-time copy is created, including the hidden and read only bits. Thus setting the hidden and read-only bits on the original volumes propagated such a status to the point-in-time copy volumes. In an embodiment, the marking is done using a mechanism called "RevertOnClose." Using the RevertOnClose mechanism indicates that when the interface layer 304 (FIG. 3) is done with the original volumes, their markings revert to their original state, e.g., visible and not read-only. In addition, if a crash were to occur, the volumes would automatically revert to their original state prior to being marked as hidden and read only. Typically however, the reversion occurs after the point-in-time copy is created so that the original volumes revert to their original state, but the point-in-time copy volumes do not, i.e., they remain hidden and read-only.

Following the marking operations 618 and 620, instruct operation 622 instructs the writers, e.g., writers 316 (FIG. 3) to prepare for the point-in-time copy process. In one embodiment the writers are called with PrepareForSnapshot. Next the instruct operation 624 instructs the writers, e.g., using a "Freeze" command, to stop writing to any volumes on which they have data. Instruct operations 622 and 624 provide the writers with the time to finish writes that have been started and to cache any new writes that are to occur. The communication between the writers and the interface layer 304 (FIG. 3) in this manner results in fewer lost updates and other conflicts.

Once all writes are frozen, instruct operation 626 instructs the providers to pre-commit to the upcoming point-in-time copy process. Pre-commit operation 626 essentially relates to a communication between the interface layer 304 and the provider to determine whether the provider is prepared to make the point-in-time copy. In an embodiment, the pre-commit phase may be more complicated. That is, the pre-commit phase, as well as the post-commit phase described below, bracket the creation of the point-in-time copy process, which is typically a very short time frame, e.g., 30 seconds. Bracketing the point-in-time copy process allows the provider time to do any special short term processing either prior to the creation of the point-in-time copy during the pre-commit phase and/or following the creation of the point-in-time copy for post-commit phase. For example, suppose that a provider needs to lock or prevent certain operations, e.g., creation and deletion of LUNs during the short time period that the point-in-time copy is being created. Using the pre-commit and post commit operations, these preparations can be made. Furthermore, the actual time needed for pre-commit and post-commit is often shorter than other preparation time windows, e.g., freezing writes.

Next, suspend operation 628 flushes and suspends all writes to all volumes participating in the point-in-time copy set. In an embodiment, a point in time may be chosen after which no further writes will reach each volume until the point-in-time copy is either created or aborted.

Following suspend operation 628, instruct operation 630 instructs the providers to actually make or instantiate the point-in-time copy. This instruction may also be referred to as a "commit" operation and may involve the providers being called with a command "CommitSnapshots." Instantiating the point-in-time copy may be done in many ways, such as by breaking the plex in a mirror configuration. At this point in time each participating provider must make sure that each point-in-time copy LUN is a relatively exact copy of the original LUN and that no further changes to the original LUN are reflected in the point-in-time copy LUN.

Once the point-in-time copy has been created, allow operation 632 allows writes to proceed. In essence, the original volumes may now be modified with the pending writes that were earlier suspended. Since the provider does not allow the modifications to pass through to the point-in-time copy, the system may allow the writes to proceed without concern for the point-in-time copy.

Additionally, a post-commit operation 634 may effectively call the providers with a PostCommitSnapshots command. The post-commit command indicates that the point-in-time copy process has been completed. As discussed above with respect to the pre-commit phase, post-commit operation 634 may be more complex and may actually provide time for the providers the time necessary to recover or revert back to the functional level existing prior to the pre-commit phase 626.

Next, thaw operation 636 provides a thaw indication to the writers, such as writers 316 (FIG. 3). The thaw command provides the writers with an indication that new writes may be send to the original volumes.

Following operation 636, which involves the original LUNs, get operation 638 gets information related to the point-in-time copy LUNs. More specifically, each provider may be called with a command "GetTargetLUNs", wherein the command includes an identification of the original LUNs. In response to this command, the providers return enough information about the point-in-time LUN corresponding to the original LUN so that the point-in-time LUN can be imported onto another system in the SAN and so that the point-in-time LUN can be uniquely identified after it has been imported. In an embodiment, the provider must return enough information in the VDS_LUN_INFORMATION such as serial number, world wide name of the LUN or port, port address on the storage box, and vendor specific information that can be used to uniquely identify the LUN.

Following get operation 638, store operation 640 stores the information about the point-in-time copy, including the mapping from original to target LUNs in the backup components document. The point-in-time copy creation procedure for the provider is complete at this point. If a failure occurs prior to store operation 640, the provider receives an indication to stop the process, e.g., an AbortSnapshots call, allowing the provider to free up resources that have been allocated for the point-in-time copy.

Figure 7:
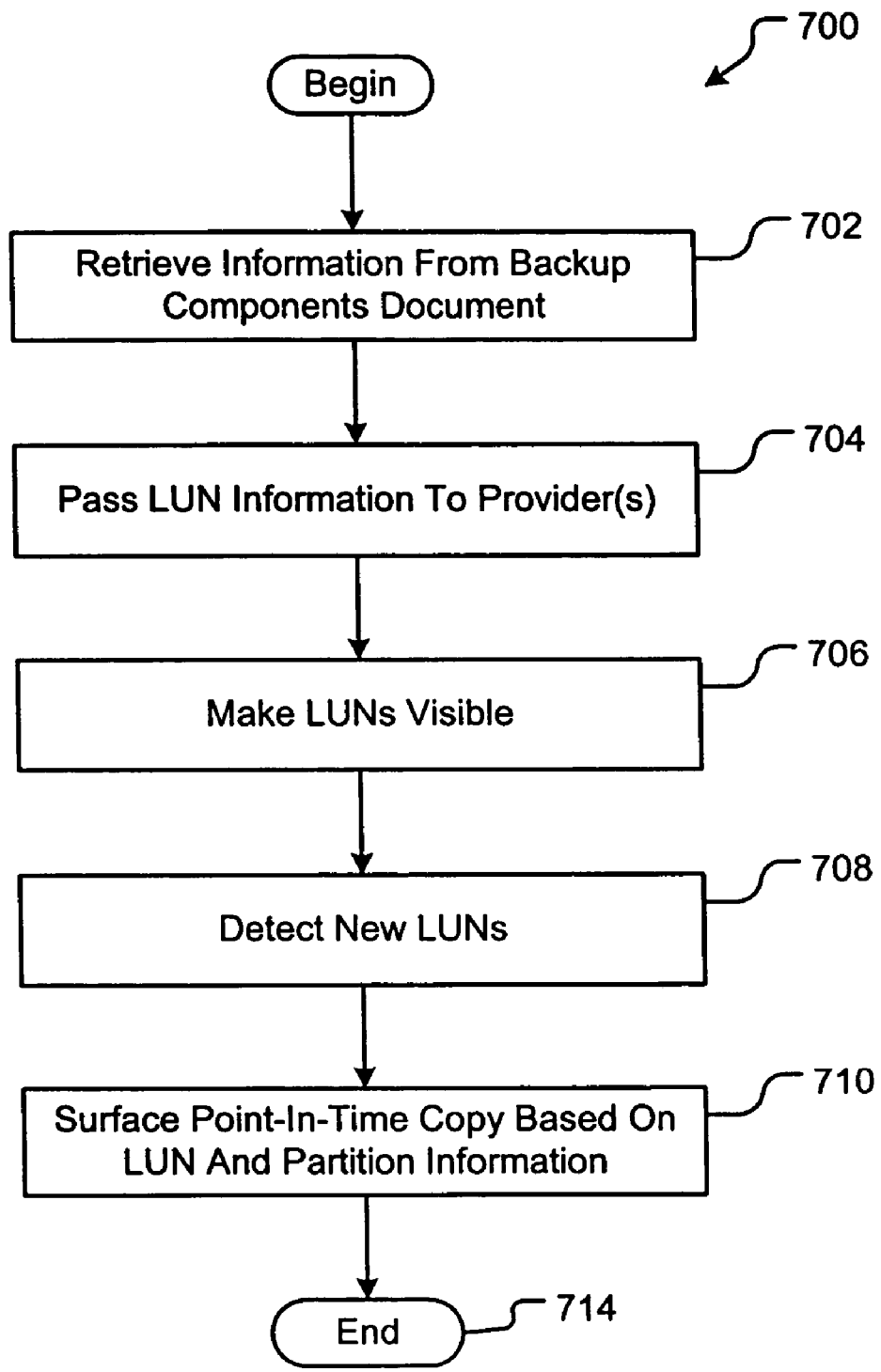
FIG. 7 illustrates a high-level flow chart of operational characteristics of the present invention with respect to transporting data content from one system to another.

FIG. 7 illustrates the relatively high-level functional components related to importing a point-in-time copy onto another computer system, such as system 104 (FIG. 1). Flow 700 generally relates to the process performed by the point-in-time copy interface layer 304 shown in FIG. 3 in response to a request to import a specific volume. The request may be made by the import module 320 or by another module indicating that a volume copy should be transported to another system.

Flow 700 begins as retrieve operation 702 retrieves the point-in-time copy information from the backup components document. An exemplary backup components XML document is attached as Appendix B. The backup components document provides information to reconstruct the volume on the second machine. In an embodiment, retrieve operation 702 uses the information in the document to construct an array of point-in-time copy LUN information.

Once the array of LUN information is constructed, pass operation 704 passes the information to the hardware provider responsible for the point-in-time copy volume. The provider information may also be included in the backup components document. In essence, the provider is called to make the LUNs available at operation 704.

Following the passing of LUN information to the provider, make operation 706 makes the LUNs visible, i.e., available. Typically, make operation 706 is performed by the provider. Making the LUNs available may involve unmasking the LUN at the storage subsystem and, if possible, filter accesses to the machine. Alternatively, the provider may work in conjunction with the interface layer 304 (FIG. 3) to rezone the switches at the network level.

Once the LUNs are available, detect operation 708 scans the subsystem for new and available LUNs, i.e., the point-in-time copies of the LUNs. As new LUNs are discovered, information from the backup components document may be used to determine which LUNs are associated with which original volumes, in the case where multiple volumes have been copied. Additionally, this information may be used to determine which portions or extents of each new LUN map to which original volume.

Upon discovering all new LUNs, surface operation 710 surfaces the new information on the second machine. In an embodiment, surface operation 710 captures the mapping information between original volumes and the point-in-time copy volumes so that mapping information can later be exposed to applications wanting access to the point-in-time copy. Once the surface operation 710 has captured the mapping information, one or more host computer systems, can be located and mounted as described in more detail with respect to FIG. 8.

Figure 8:
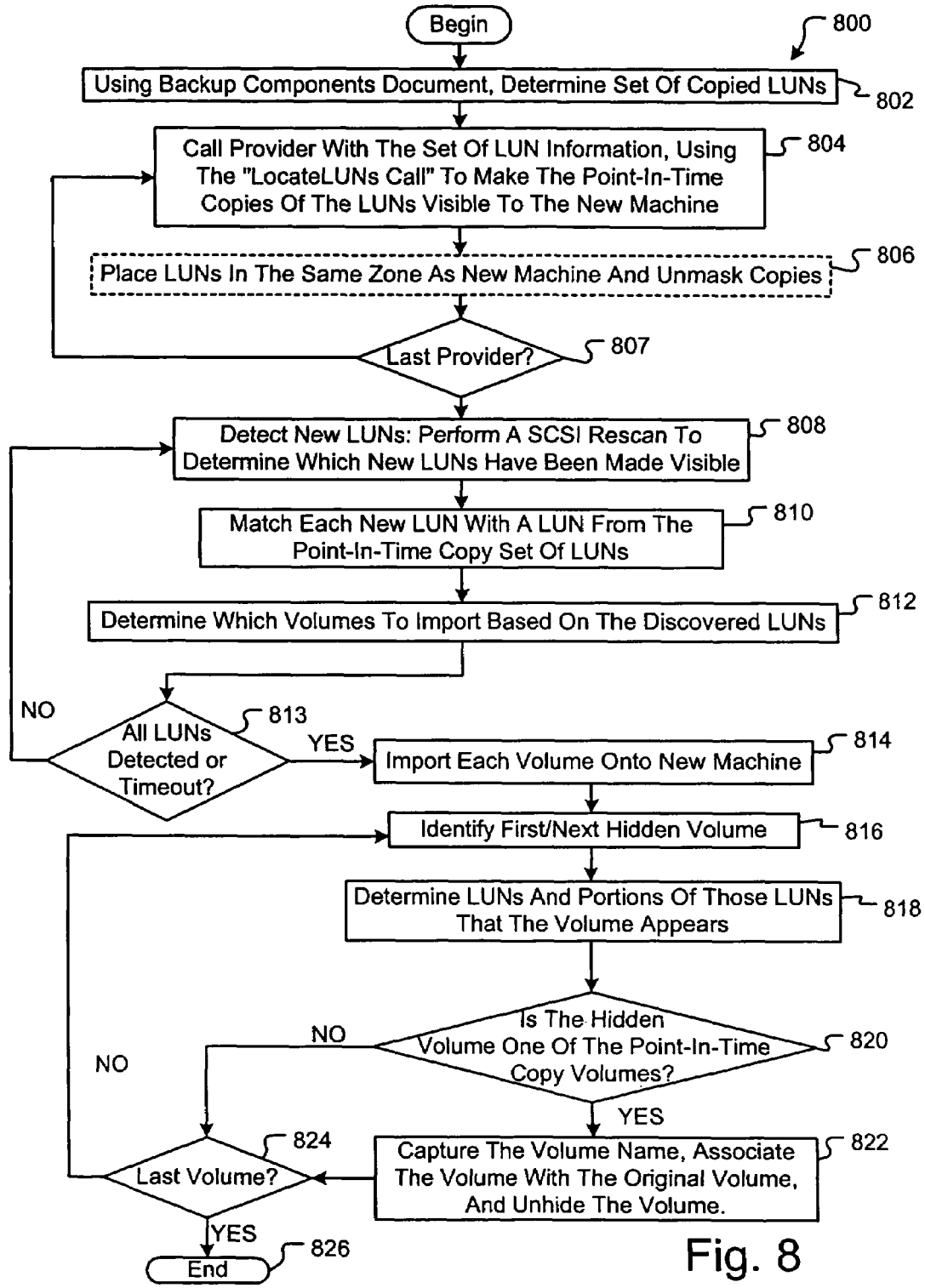
FIG. 8 illustrates a more-detailed flow chart of operational characteristics of a particular embodiment of the present invention with respect to transporting data content from one system to another.

FIG. 8 illustrates a more detailed functional component flow chart related to importing a point-in-time copy onto another computer system, such as system 104 (FIG. 1). Flow 800 is similar to flow 700 in that the a point-in-time copy exists prior to beginning the flow and that the process is generally performed by the point-in-time copy interface layer 304 shown in FIG. 3 in response to a request to import a specific volume. Flow 800, however, relates to importing a volume when the volume was originally part of a pointin-time copy set having more than one point-in-time copy volume as well as other details described below.

Prior to the beginning of flow 800, the importer needs the backup components document that was returned when the point-in-time copy set was created in order to import the point-in-time copy set onto a second machine. The backup components document is, in one embodiment, an XML document so it can be transported as a simple text file between machines. The XML document is given to the interface layer 304, which uses the document to extract the information needed to import the point-in-time copy set.

Flow 800 begins with determine operation 802, which determines the set of point-in-time copy LUNs. That is, the set of point-in-time LUNs is determined using the backup components document.

Next, the LUN information for these point-in-time copy LUNs is constructed and the hardware provider that created the point-in-time copy is called, at call operation 804, with the set of point-in-time copy LUNs that were created by that provider. In an embodiment, the call relates to a "Locate-Luns" call and in response to this call, the provider must make all the point-in-time copy LUNs visible to the machine where the point-in-time copy set is being imported.

In a particular embodiment, the process of making the LUN visible is done during place operation 806, which places the LUNs in the same zone as the importer and also unmasks those LUNs at the storage subsystem so that they are visible to the importer system. However, in other embodiments, other methods may be used to make the LUNs visible on the new machine. Also, it should be understood that a single provider may only be able to make a subset of the entire LUN set visible. In this case, only those point-in-time copy volumes that are fully contained on the LUNs that are made visible to the importing machine will be imported.

Following place operation 806, test operation 807 determines whether more providers need to be called. That is, since a point-in-time copy set may involve multiple volumes created by multiple providers, each of the participating providers need to be called with their respective sets of LUN information. Consequently, steps 804, 806 and 807 are repeated until all participating providers have been called.

Next, detect operation 808 detects any new LUNs. This operation is similar to operation 708 described above in conjunction with FIG. 7. In a particular embodiment however, the detect operation involves performing a SCSI rescan in order to determine which new LUNs have been made visible within a zone.

Upon detecting a new LUN, the new LUN is matched, at match operation 810 against information identifying point-in-time copy LUNs. In a particular embodiment the process for matching a new LUN with a point-in-time copy LUN is shown and described with respect to FIG. 9, discussed below. In essence, each new LUN that has been discovered is matched with identifying information from the backup components documents such that the interface layer not only has access to the LUN but also can map the new LUN to an original LUN.

Following match operation 810, the coordinator, or interface layer, determines at determine operation 812, which point-in-time copy volumes should be imported based on the set of LUNs found during the detect and match operations 808 and 810, respectively. That is, assuming all the LUNs for a particular volume are found and matched correctly, then that volume may be imported. If, however, all LUNs for a particular volume are not found, then that volume cannot be imported.

Next, check operation 813 checks to see whether there are more LUNs that need to be located. Check operation 813 essentially determines whether other LUNs identified in the Backup Components Document need to be discovered but have yet to be discovered. For each iteration through the loop one or more new LUNs may be discovered. As discussed below with respect to FIG. 9, another loop may be used to cycle through and match the various LUNs discovered for each iteration through process steps 804, 806 and 807. Typically, all the LUNs are detected on the first iteration of the loop 804, 806 and 807 but, unfortunately limitations of the SCSI rescan operation, e.g., the fact that it is particularly asynchronous, multiple detection operations 804 may be required.

If more LUNs need to be discovered then flow branches NO to detect operation 808. Otherwise flow branches YES to import operation 814. Alternatively, a timer may be implemented to stop the detection process associated with operation 808, 810 and 812 such that following a predetermined time, flow branches to import operation 814 even if some identified LUNs have not been discovered.

For each volume that is to be imported, as determined by determine operation 812, import operation 814 imports the new volume onto the new machine. In operation the import module causes the "volume manager" for that volume to import those volumes onto the machine. The volume manager actually surfaces the volume. That is, in many cases, such as in the case of dynamic volumes which may have multiple LUNs, the volumes are not automatically surfaced when detected by a machine. Instead, the volume either has to have been created on that machine in the first place, or has to be imported onto that machine using a volume manager, which imports the volume. Upon importing volumes to the new machine, the set of volumes on the machine include the point-in-time copy volumes plus potentially other volumes that have were located on the LUNs that contained the point-in-time copy volumes, but were not necessarily included in the point-in-time copy set. It should be understood however, that at this point all the point-in-time copy volumes and the other volumes on the point-in-time LUNs are marked as hidden.

Since there may be volumes in the imported data that is not wanted, the next step is to determine which volumes should be unhidden, as opposed to those that should be left hidden. In order to do so, the first step involves identify operation 816, which identifies the first hidden volume. Identify operation 816 uses the capable of the system to list the set of hidden volumes on the system. Thus, the first hidden volume may be identified.

Once identified, determine operation 818 determines the LUNs and portions of those LUNs that the identified volume appears. This information may be gleaned from the volume information itself. That is, using the volume information, appropriate system calls may be made to determine which LUNs the volume appears on and which portions of those LUNs are used by the volume.

Using the LUN and portion information related to the volume, compare operation 820 compares the hidden volume information with the backup components document to determine if the hidden volume is one of the point-in-time copy volumes. That is, this information is matched with the information in the backup components document to determine if the hidden volume matches one of the snapshot volumes.

If compare operation 820 determines that the volume is one of the point-in-time copy volumes then flow branches YES to capture operation 822 which captures the volume name and associate the volume with the original volume that was used to create the point-in-time copy volume. In addition, operation 822 may further unhide the point-in-time copy volume.

Following capture operation 822, check operation 824 check to see if there are more volumes that need to be captured or evaluated from the hidden volume list. If not, then flow branches YES to end operation 826 which ends flow 800. If so however, flow braches NO back to identify next hidden volume operation 816. Similarly, if compare operation 820 determines that the volume is not one of the point-in-time copy volumes, then flow branches to capture operation 822. In essence, operations 816, 818, 820 and 824 are repeated until all hidden volumes have been evaluated.

In a particular embodiment, upon completion of flow 800, the system has, for each volume in the point-in-time copy set, the name of the original volume, the machine where the original volume resided when the point-in-time copy was created, and the name of the snapshot volume. Additionally, upon completion of flow 800, each point-in-time copy volume is marked as visible and read only. Moreover, any other volumes that were brought along with the point-in-time copy volumes because they resided on the point-in-time copy LUNs remain marked as hidden.

With this information the requestor can determine how to map from the original volumes in the point-in-time copy set to the point-in-time copy volumes in the point-in-time copy set. For example, suppose that the requestor is a backup application and it was backing up the contents of drive c:\ on the original machine and the point-in-time copy volume materialized as \\?\GLOBALROOT\Device\HarddiskVolume55 on the machine where the import is done. The backup can substitute \\?\GLOBALROOT\Device\Harddisk55\ for c:\ for each file being backed up to extract the corresponding file from the point-in-time copy volume. "GLOBALROOT" is an all caps symbolic link but a case insensitive open would succeed with a lower or mixed case "GlobalRoot."

Figure 9:
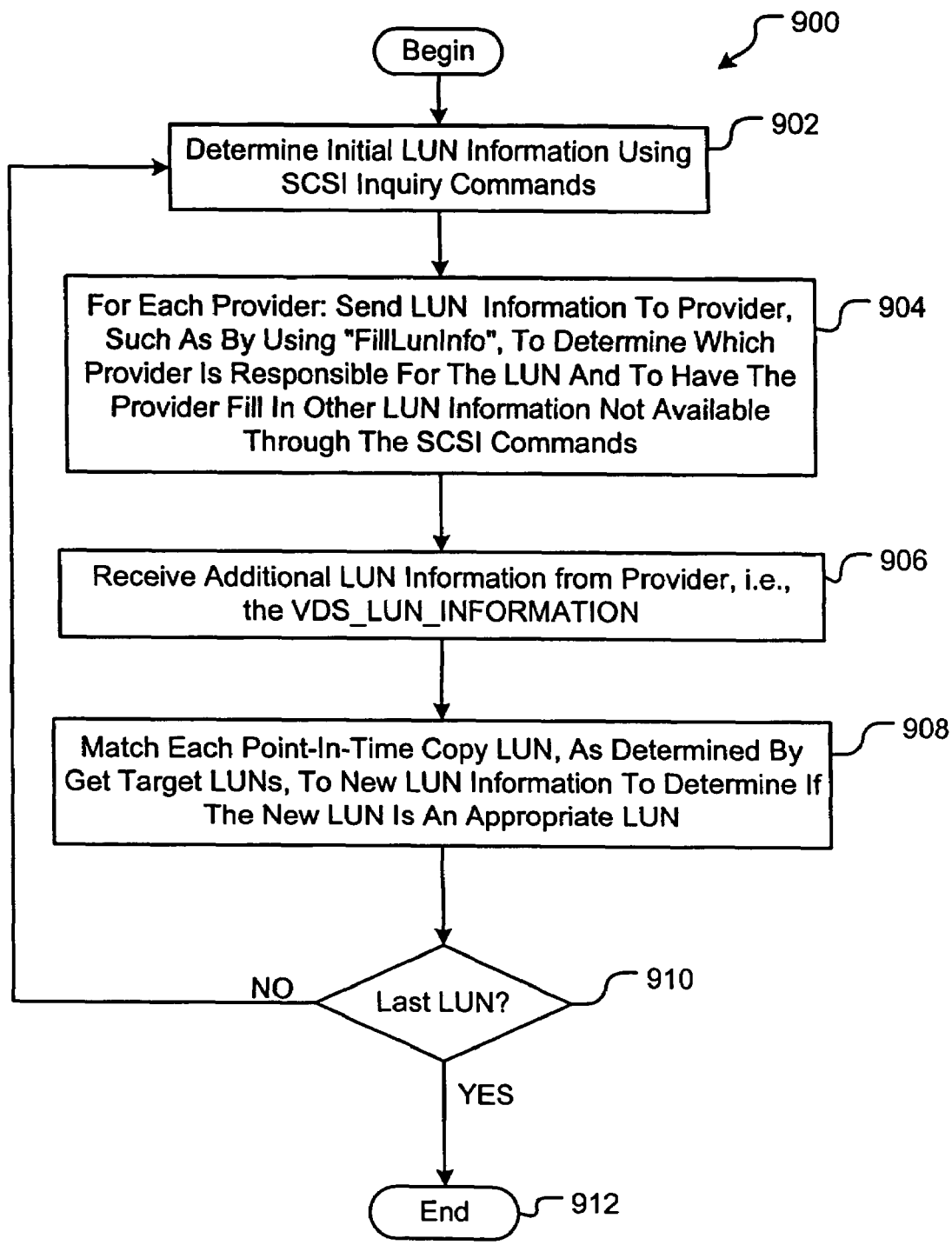
FIG. 9 illustrates a flow chart of operational characteristics of the act of matching discovered LUNs with point-in-time copy set LUNs, where the matching act is shown and described in conjunction with FIG. 8.

FIG. 9 illustrates a flow chart of operational characteristics of the act of matching discovered LUNs with point-in-time copy set LUNs, where the matching act is shown and described in conjunction with FIG. 8. Initially, determine operation 902 determines initial LUN information using SCSI inquiry commands. Then, for each provider participating in the point-in-time copy set, send operation 904 sends the LUN information determined at operation 902. Send operation may further call each provider using the "FillInLunInfo" command to determine which provider is responsible for the LUN and to receive other information about the LUN, e.g., information that is not available through the basic SCSI inquiry commands.

Following send operation 904, receive operation receives the additional information about the LUN from one of the providers. That is, once a provider indicates creatorship of the LUN, it fills in the VDS_LUN_INFORMATION and sends it back. Upon receiving the information, each point-in-time copy LUN (as determined by GetTargetLuns when the point-in-time copy was created) is matched, at match operation 908, against the LUN information for the newly arrived LUN. If the LUN information matches, then it is known that the LUN is an appropriate target LUN.

Next, check operation 910 checks to see if there are other new LUNs that have been discovered that need to be evaluated, i.e., whether this is the last LUN. If so, then flow branches YES to end operation 912. Otherwise flow branches NO back to operation 902 to restart the process of evaluating another LUN against the GetTargetLun list.

Figure 10:
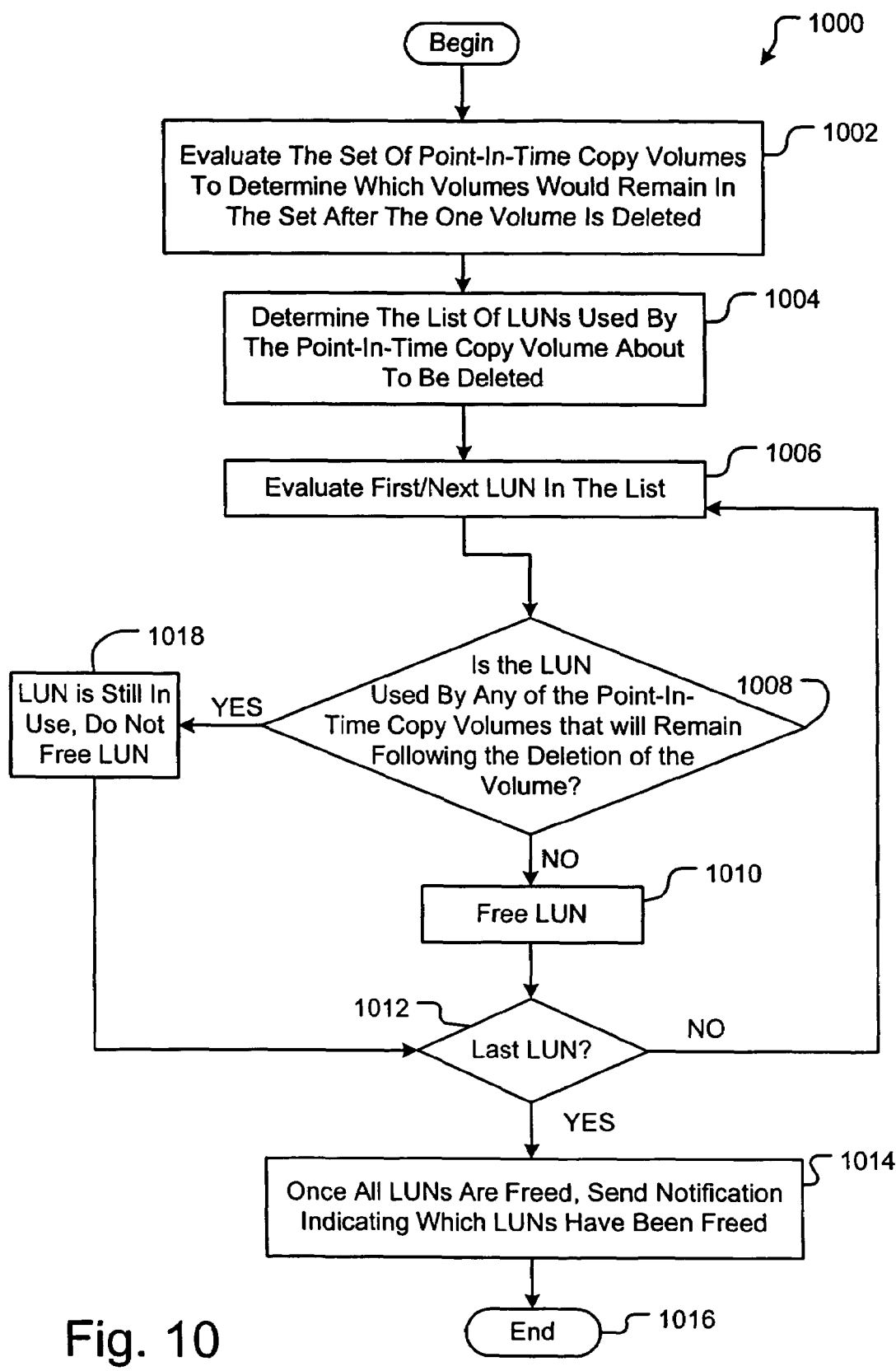
FIG. 10 illustrates a flow chart of operational characteristics of the present invention with respect to deleting a point-in-time copy of a volume, the volume being part of a point-in-time copy set.

FIG. 10 illustrates a flow chart of operational characteristics of the process of deleting LUNs in a point-in-time copy set of LUNs. Essentially, in order to improve performance of a system, it becomes important to recover resources, such as LUNs allocated by the storage system for point-in-time copy sets, when those point-in-time copies are no longer needed. The process of deleting a point-in-time copy a single volume involves the process shown in FIG. 10. All LUNs discussed with respect to FIG. 10 are point-in-time copy LUNs.

Initially, evaluate operation 1002 evaluates the set of point-in-time copy volumes to determine which volumes will remain in the set following the deletion of the one predetermined volume. In this case the point-in-time copy set includes more than one volume and evaluation step 1002 is used to identify the remaining or other volumes in the set.

Upon identifying the remaining volumes, determine operation 1004 determines or compiles a list of LUNs used by the point-in-time copy volume that is about to be deleted. These LUNs may be determined from the volume mapping information or other appropriate system calls.

Next, evaluate operation 1006 identifies the first LUN in the list of LUNs used by the point-in-time copy volume that is about to be deleted. Operation 1006 essentially starts a loop that evaluates each LUN in the list to determine whether the LUN can be deleted because no point-in-time copy volume resides on the LUN once the current point-in-time copy volume is deleted. Upon identifying the first or next LUN in the list, determine operation 1008 determines if the first or next LUN is being used by any of the point-in-time copy volumes that will remain following the deletion of the volume as determined above in operation 1002.

If the first or next LUN is not being used by another point-in-time copy volume in the set, then the LUN may be deleted. Free operation 1010 frees or deletes the LUN. In order to free the LUN, a call to the hardware provider may be made, such as with a "OnLunFree" call that specifies the LUN to be freed. Note that when all the point-in-time copy volumes in a point-in-time copy set are deleted, then all the LUNs used by that point-in-time copy set are also freed.

Following free operation 1010, test operation 1012 tests the LUN against the list of LUNs to be evaluated to determine if the LUN is the last LUN in the list. If not, then flow branches back to evaluate operation 1006 where the next LUN in the list is identified and evaluated to see if it can be deleted as before. If the LUN is the last LUN in the list, then flow branches YES to send operation 1014.

Send operation 1014 sends, once all LUNs that can be deleted are freed, a notification to the volume managers for those LUNs that those LUNs have been freed. This allows the volume manager to remove or modify state information about those LUNs. Following send operation 1014, flow 900 ends at end operation 1016.

Referring back to operation 1008, if the first or next LUN being evaluated is being used by another volume in the point-in-time copy set, then flow branches YES to operation 1018. Operation 1018 indicates that the LUN is still in use and should not be freed. Operation 1018 may further provide a message back to the system indicating that the LUN may not be freed, but providing the message may not be necessary in some embodiments. Following operation 1018, flow branches to test operation 1012, which as described above tests the LUN against the list of LUNs to be evaluated to determine if the LUN is the last LUN in the list. If not, then flow branches NO back to evaluate operation 1006 where the next LUN in the list is identified and evaluated to see if it can be deleted as before. Otherwise flow branches YES to send operation 1014 as described above.

Using the system and method described above, content can be effectively transported from one machine on a SAN to another. Indeed, the above system and method effectively enables a protocol where the point-in-time copy provider, e.g. provider 306 shown in FIG. 3, is able to create point-in-time copies using only the physical components it controls (i.e., LUNs) and not having to understand anything about the volumes, file systems, or applications running on those physical components. Moreover, the above system and method provides the ability to describe a LUN in such a way that it can be transported and discovered on the machine to which it is transported without additional processing. The method also allows for combining multiple volumes into a copy set and transporting the set as a group. Further, the receiving machine does not see information on LUNs that are not associated with volume it is receiving.

The above specification, examples and data provide a complete description of the manufacture and use of the composition of the invention. Since many embodiments of the invention can be made without departing from the spirit and scope of the invention, the invention resides in the claims hereinafter appended.

APPENDIX A

Hardware Provider Interfaces and Methods

Introduction

The Hardware Point-In-Time Copy or Snapshot Provider interfaces are IVssAdmin, IVssProviderNotifications, IVssProviderCreateSnapshotSet, and IVssHardwareSnapshotProvider.

IVssAdmin

The IVssAdmin interface is implemented by VSS, and manages the list of registered providers.

| Methods | |
| --- | --- |
| Name | Description |
| QueryProviders | Queries all registered providers. |
| RegisterProvider | Registers a new snapshot provider. |
| UnregisterProvider | Unregisters an existing provider. |

IVssProviderNotification

Snapshot providers can be frequently loaded and unloaded. To detect this, providers can provide an optional Notification Interface IVssProviderNotifications. Implementation is optional; providers only need to implement this interface if it is useful for them to catch these events.

The IVssProviderNotifications interface is implemented by the provider and is used by VSS to notify the provider about specific events. Every provider must support this interface. This interface must be accessible using IVssHardwareSnapshotProvider::QueryInterface.

| Methods | |
| --- | --- |
| Name | Description |
| OnLoad | Called by VSS to notify the provider that it was just loaded. |
| OnUnload | Called by VSS to notify the provider that it will be unloaded. |

IVssProviderCreateSnapshotSet

The IVssProviderCreateSnapshotSet interface contains the methods during snapshot creation.

All providers must support this interface; the interface is common to software and hardware providers.

| Methods | |
| --- | --- |
| Name | Description |
| EndPrepareSnapshots | Ensure all LUNs in the snapshot set are prepared |
| PreCommitSnapshots | Ensure that the provider is ready to quickly commit the prepared LUNs. This happens immediately before the Flush-and-hold writes, but while applications are in their frozen states. |
| CommitSnapshots | Quickly commit all LUNs in this provider. Special restrictions exist on what operations the Provider may perform during this call. |
| PostCommitSnapshots | Called after all the snapshots have been committed. This happens immediately after the release-writes to the I/O subsystem, but while applications are in still in their frozen states. |
| AbortSnapshots | Ends the prepared snapshots in this provider. This includes all non-committed snapshots and any pre-committed ones. |

IVssHardwareSnapshotProvider

Each hardware provider must implement the IVssHardwareSnapshotProvider interface. The COM class that implements this interface is specified by the administrator in IVssAdmin::RegisterProvider at registration time.

| Methods | |
| --- | --- |
| Name | Description |
| AreLunsSupported | Allows VSS to determine if this hardware provider can snapshot the LUNs that contribute to a specific original volume. The provider also updates the VDS_LUN_INFO structure. |
| BeginPrepareSnapshot | Adds LUNs to the snapshot set. |
| GetTargetLuns | Retrieves the hardware identification information for each new created LUN |
| LocateLuns | Performs any necessary RAID subsystem unmasking and/or zoning to allow a snapshot LUN to be discovered by this machine. |
| OnLunEmpty | Notifies the provider that a LUN that previously contained snapshot no longer contains data of interest. |

IVssAdmin: Registration of Snapshot Providers

A provider registers with VSS via IVssAdmin::RegisterProvider( ):

```
STDMETHODIMP IVssAdmin::RegisterProvider(
    IN    VSS_ID              ProviderId,
    IN    CLSID               ClassId,
    IN    VSS_PWSZ            pwszProviderName,
    IN    VSS_PROVIDER_TYPE   eProviderType,
    IN    VSS_PWSZ            pwszProviderVersion,
    IN    VSS_ID              ProviderVersionId
    )
```

IVssAdmin::UnRegisterProvider( ) deregisters the provider and removes it and any snapshots instantiated by the provider from snapshot management.

The ProviderId is a GUID that uniquely and persistently identifies the Provider. For example the volsnap.sys provider is defined as:

const GUID VSS_SWPRV_ProviderId={0xb5946137, 0x7b9f, 0x4925, {0xaf, 0x80, 0x51, 0xab, 0xd6, 0xb, 0x20, 0xd5}};

Once defined, the ProviderId should remain the same; this is true even when the software revision is updated. The only reason for changing a provider GUID is when the provider functionality changes and both providers might reasonably be active on the same system.

IVssProviderCreateSnapshot: Creating Snapshots

The IVssProviderCreateSnapshotSet interface contains the methods used during snapshot creation. All providers must support this interface; the interface is common to software and hardware providers.

For all methods, a successful return indicates that processing for any and all LUNs in the snapshot set was successful.

IVssProviderCreateSnapshot::EndPrepareSnapshots

This method will be called once for the complete snapshot set. After this is called, there will be no more BeginPrepareSnapshot calls. This method is intended as a rendezvous where the provider can wait for any snapshot preparation work to complete.

```
HRESULT EndPrepareSnapshots (
    [in]    VSS_ID    SnapshotSetId,
);
Parameters
    SnapshotSetId
        [in] Snapshot set identifier
```

IVssProviderCreateSnapshot::PreCommitSnapshots

The PreCommitSnapshots method is called prior to snapshot commit. It should be used to prepare all snapshots in this SnapshotSet for committing by the subsequent CommitSnapshots( ) method. While this is called, applications have been frozen (but the I/O subsystem is not yet blocking filesystem I/O) so the provider should attempt to minimize the amount of time spent in this method.

```
HRESULT PreCommitSnapshots(
    [in]    VSS_ID    SnapshotSetId,
);
```

Parameters
    SnapshotSetId
        [in] Snapshot set identifier.

IVssProviderCreateSnapshot::CommitSnapshots

The CommitSnapshots method is called at the defined instant at which the snapshots should be taken. For each prepared LUN in this snapshot set, the provider shall perform whatever work is appropriate in order to persist the point-in-time LUN contents. While this method is called, both applications and the I/O subsystem are quiesced so the provider must attempt to minimize the amount of time spent in this method. As a general rule, a provider should spend less than 1 second in this method.

In addition, since the I/O system is quiesced at this time, the provider shall take great care not to initiate any I/O that may deadlock the system—for example debug/tracing I/O by the method or by any methods it has invoked (Note that VM-oriented file or paging I/O will not be frozen at this time).

```
HRESULT CommitSnapshots(
    [in]    VSS_ID    SnapshotSetId,
);
Parameters
    SnapshotSetId
        [in] Snapshot set identifier.
```

IVssProviderCreateSnapshot::PostCommitSnapshots

The PostCommitSnapshots method is called after all providers involved in the snapshot set have succeeded with CommitSnapshots, and VSS has released the 'Lovelace' lock on the system I/O. Note that applications are still frozen at this time.

This method is an opportunity for the provider to provide additional cleanup work after the snapshot commit. Note that lSnapshotCount should not be needed by hardware providers but is necessary for software providers.

```
HRESULT PostCommitSnapshots(
    [in]    VSS_ID    SnapshotSetId,
    [in]    LONG      lSnapshotCount
);
Parameters
    SnapshotSetId
        [in] Snapshot set identifier.
    lSnapshotCount
        [in] Count of snapshots in the snapshot set.
```

IVssProviderCreateSnapshot::AbortSnapshots

The AbortSnapshots method aborts prepared snapshots in this provide. This includes all non-committed snapshots and pre-committed ones.

```
HRESULT AbortSnapshots(
    [in]    VSS_ID    SnapshotSetId
);
```

IVssHardwareSnapshotProvider: Managing LUNs and Volumes

The IVssHardwareSnapshotProvider interface contains the methods used by VSS to map volumes to LUNs, discover LUNs created during the snapshot process, and transport LUNs on a SAN. All hardware providers must support this interface.

VDS_LUN_INFO

VDS_LUN_INFO structure contains all hardware properties that can be used to locate a LUN.

VSS initializes the fields from the SCSI Inquiry Data, plus the Inquiry Data Vital Product Data Pages 0x80 and 0x83 for all LUNs that contribute to a snapshots set. The provider initializes any interconnect specific addresses for any such LUNs and/or corrects any omissions.

For all LUNs created by committing a snapshot, the provider initializes all fields. This allows the newly created LUNs to be located by Windows software both on the original machine and/or any other machine in a SAN.

```
typedef struct _VDS_LUN_INFO
{
  ULONG m_version;
  // The SCSI-2 device type
  BYTE m_DeviceType;
  // The SCSI-2 device type modifier (if any) - this may be zero
  BYTE m_DeviceTypeModifier;
  // Flag indicating whether the device can support multiple
  // outstanding commands. The actual synchronization in this
  // case is the responsibility of the port driver.
  BOOL m_bCommandQueueing;
  // Contains the bus type (as defined above) of the device. It
  // should be used to interpret the raw device properties at
  // the end of this structure (if any)
  VDS_STORAGE_BUS_TYPE BusType;
  // vendor id string. For devices with no such ID
  // this will be zero
  [string] char *m_szVendorId;
  // device's product id string. For devices with no such ID
  // this will be zero
  [string] char *m_szProductId;
  // zero-terminated ascii string containing the device's
  // product revision string. For devices with no such string
  // this will be zero
  [string] char *m_szProductRevision;
  // zero-terminated ascii string containing the device's
  // serial number. For devices with no serial number
  // this will be zero
  [string] char *m_szSerialNumber;
  // device id descriptor
  VDS_STORAGE_DEVICE_ID_DESCRIPTOR
  m_deviceIdDescriptor;
  // number of interconnects
  ULONG cInterconnects;
  // array of interconnects
  [size_is(cInterconnects)] VDS_INTERCONNECT *rgInterconnects;
} VDS_LUN_INFO;
typedef struct _VDS_INTERCONNECT
{
  // address type
  VDS_INTERCONNECT_ADDRESS_TYPE m_addressType;
  // port that address refers to
  ULONG m_cbPort;
  // actual address of port
  [size_is(m_cbPort)] BYTE *m_pbPort;
  // size of address
  ULONG m_cbAddress;
  // address relative to the port
  [size_is(m_cbAddress)] BYTE *m_pbAddress;
} VDS_INTERCONNECT;
```

Notes:
All disk or LUN identification structures are defined by the Virtual Disk Service (VDS). The Volume Snapshot Service and Fabric Virtualization Service use these same definitions.
The VDS_STORAGE_DEVICE_ID_DESCRIPTORS directly corresponds to the return from context page 0x83.
VDS_INTERCONNECT_ADDRESS_TYPE is an enumeration of recognized interconnect addressing schemes and includes, but is not limited to, FCFS, FCPH, FCP3, MAC (iSCSI), and SCSI.

IVssHardwareSnapshotProvider::AreLunsSupported

This method will be called for each snapshot that is added to the snapshot set. Prior to invoking this method, VSS determines the LUNs that contribute to the LUN.

For a specific volume, each LUN can contribute only once; a specific LUN may contribute to multiple volumes. VSS does no tracking of LUNs. The same LUN will never appear more than once in a single call, but may reappear on subsequent calls. Consider the case of two snapshot volumes: D: and E:. D: is an extended volume contained on LUNS 1 and 2. E: is a simple volume contained on LUN 2. If both volumes are added to the same snapshot set, LUN 2 will appear on subsequent calls.

Prior to returning success, the provider updates the VDS_LUN_INFO structure with the LUN interconnect address(es) and any additional information to ensure later recognition of the LUN.

Additionally a rgwszDeviceNames parameter is provided to give the device name of the LUN allowing the provider to open the device itself if necessary.

```
HRESULT AreLunsSupported (
    [in]    LONG    lLunCount,
    [in]    LONG    lContext,
    [in, unique, size_is(lLunCount)] VSS_PWSZ *rgwszDevices,
    [in, out, size_is(lLunCount)] VDS_LUN_INFO *pLunInformation,
    [out]   BOOL    *pbIsSupported
);
Parameters
    lLunCount
    [in] Number of LUNs contributin to this snapshot volume
    pLunInformation
    [in, out] Array of VDS_LUN_INFO for each LUN
    contributing to the snapshot volume.
```

Parameters lLuncount

[in] Number of LUNs contributing to this snapshot volume.

rgwszDevices.

Array of device names one for each lun. Each device names can be used to open the device using the CreateFile API

IVssHardwareSnapshotProvider::BeginPrepareSnapshot

This method will be called for each snapshot that is added to the Snapshot set.

```
HRESULT BeginPrepareSnapshot(
    [in]    VSS_ID    SnapshotSetId,
    [in]    VSS_ID    SnapshotId,
    [in]    LONG      lLunCount,
    [in]    LONG      lContext,
    [in, unique, size_is(lLunCount)] VSS_PWSZ *rgDeviceNames,
    [in, out, size_is(lLunCount)] VDS_LUN_INFO *rgLunInformation
);
Parameters
    SnapshotSetId
    [in] Snapshot set identifier.
    SnapshotId
    [in] Name of the volume the snapshot is to be created on.
    lLunCount
    [in] Number of LUNs contributing to this snapshot volume
```

Parameters
SnapshotSetId
[in] Snapshot set identifier.
SnapshotId
[in] Name of the volume the snapshot is to be created on.
ILunCount
[in] Number of LUNs contributing to this snapshot volume
rgLunInformation
[in] Array of VDS_LUN_INFO for each LUN contributing to the snapshot volume
rgwszDeviceNames.
Array of device names one for each lun. Each device names can be used to open the device using the CreateFile API IVssHardwareSnapshotProvider::GetTargetLuns This method will be called once after PostCommitSnapshots for the complete snapshot set. Identifying information for each newly created LUN is returned to VSS. That information must include not only the device attributes (eg serial number), but also any and all network addresses.

HRESULT GetTargetLuns(
    [in] LONG lLunCount,
    [in, unique, size_is(lLunCount)] VSS_PWSZ *rgDeviceNames,
    [in, unique, size_is(lLunCount)] VDS_LUN_INFO *rgSourceLuns,
    [in, out, size_is(lLunCount)] VDS_LUN_INFO *rgDestinationLuns );

Parameters
ILunCount
[in] Number of LUNs contributing to this snapshot volume
rgSourceLuns
[in] Array of VDS_LUN_INFO for each LUN contributing to the snapshot volume snapshot set identifier.
rgDestinationLuns
[out] Array of VDS_LUN_INFO for each new LUN created during snapshot processing.
There should be a one-to-one correspondence between each element of rgSourceLuns and rgDestinationLuns.
rgwszDeviceNames.
Array of device names one for each lun. Each device names can be used to open the device using the CreateFile API IVssHardwareSnapshotProvider::OnLunEmpty This method is called whenever VSS determines that snapshot LUN contains no interesting data. All snapshots have been deleted (which also causes deletion of the volume). The LUN resources may be reclaimed by the provider and reused for another purpose.

Note that OnLunEmpty is called on a best effort basis. VSS invokes the method ONLY when the LUN is guaranteed to be empty. There may be many cases where the LUN is empty but VSS is unable to detect this. An example of this case is when a snapshot LUN is moved to a different host but not actually transported or imported by VSS. That LUN appears as any other LUN and volumes can be simply deleted via Disk Management without any notification of VSS.

```
HRESULT OnLunEmpty (
    [in, unique]    VSS_PWSZ *wszDeviceName,
    [in, unique]    VDS_LUN_INFO *pInformation
);
Parameters
    pInformation
    [in] The VDS_LUN_INFO for an empty LUN
```

Parameters
pInformation
[in] The VDS_LUN_INFO for an empty LUN
wszDeviceName
The name of the device corresponding to the lun being freed up. The device name can be used to open the device using the CreateFile API.

IVssHardwareSnapshotProvider::LocateLuns

This method will be called once when a snapshot set is transported between machines. The provider is responsible for any unmasking at the hardware and any necessary switch zoning. VDS_LUN_INFO passed to the provider is exactly that received by VSS at GetTargetLuns.

Immediately after this method completes, VSS will perform any host-based unmasking and invoke IOCTL_DISK_FIND_NEW_DEVICES. This causes any exposed LUNs to be discovered by PNP. Note that host-based masking is a post-Whistler feature.

```
HRESULT LocateLuns(
    [in]    LONG    lLunCount,
    [in, unique, size_is(lLunCount)]
            VDS_LUN_INFO *rgSourceLuns);
```

IVssHardwareSnapshotProvider::FillnLuninfo

This method will be called when information is needed about a particular Lun. The provider is responsible for supplying this information.

```
HRESULT FillInLunInfo(
    [in]    VSSPWSZ wszDeviceName,
    [in, out] VDS_LUN_INFO *pLunInfo,
    [out]   BOOL *pbIsSupported
);
    wszDeviceName - name of the device being queried. The device name can be used to open the device using the CreateFile API,
    pLunInfo - lun information for the device. The hardware provider should fill in any fields in the lun information to uniquely identify
```

-continued the device in such away that the lun information matches the lun
information for the device as returned in GetTargetLuns.]
  pbIsSupported - whether this provider supports the device.
]

APPENDIX B

EXEMPLARY BACKUP COMPONENTS DOCUMENT

```
- <Schema name="VssComponentMetadata" xmlns="urn:schemas-microsoft-com:xml-
    data" xmlns:dt="urn:schemas-microsoft-com:datatypes">
-   <AttributeType name="filespec" dt:type="string" required="yes">
      <description>File specification. Can include wildcard characters ? and
         *</description>
    </AttributeType>
-   <AttributeType name="path" dt:type="string" required="yes">
      <description>Path to a file. The path can include environment variables or
         values extracted from registry keys.</description>
    </AttributeType>
-   <AttributeType name="recursive" dt:type="enumeration" dt:values="yes no"
         default="no">
      <description>Is path specified recursive or limited to the directory that is
         specified.</description>
    </AttributeType>
-   <AttributeType name="alternatePath" dt:type="string" required="no">
      <description>Alternate path in which to find the file. Files in a file group
         may have been copied to an alternative location by the writer. Backup
         should pick up the files from the alternative location instead of the
         original location but should restore the files to their original
         location</description>
    </AttributeType>
-   <AttributeType name="logicalPath" dt:type="string" required="no">
      <description>Logical path for a database or file group. This logical name
         uses backslash as separators to form a logical namespace
         hierarchy</description>
    </AttributeType>
-   <AttributeType name="componentName" dt:type="string" required="yes">
      <description>Name used to identify a database or file group. May be
         qualified by a logical path.</description>
    </AttributeType>
-   <AttributeType name="version" dt:type="enumeration" dt:values="1.0"
         required="yes">
      <description>Version of a specific document</description>
    </AttributeType>
-   <AttributeType name="writerId" dt:type="uuid" required="yes">
      <description>Unique id to identify the writer. Note that this identifies the
         writer class rather than a specific instance of the writer.</description>
    </AttributeType>
-   <AttributeType name="instanceId" dt:type="uuid" required="no">
      <description>Unique id identifying the instance of a writer during backup.
         It has no meaning during restore.</description>
    </AttributeType>
-   <ElementType name="BACKUP_COMPONENTS" content="eltOnly" model="closed"
         order="many">
      <description>Components that are backed up or restored. Used to
         communicate between the writer and the backup application during
         backup and restore.</description>
-     <AttributeType name="selectComponents" dt:type="enumeration"
         dt:values="yes no" default="no">
         <description>Does the backup application select individual
            components or does it backup entire volumes</description>
      </AttributeType>
-     <AttributeType name="bootableSystemStateBackup" dt:type="enumeration"
         dt:values="yes no" default="no">
         <description>Is backup saving the bootable state of the
            system.</description>
      </AttributeType>
-     <AttributeType name="backupType" dt:type="enumeration" dt:values="full
            differential incremental log other" required="yes">
         <description>Type of backup being performed.</description>
      </AttributeType>
```

APPENDIX B-continued

EXEMPLARY BACKUP COMPONENTS DOCUMENT

```
- <AttributeType name="partialFileSupport" dt:type="enumeration"
      dt:values="yes no" default="no">
    <description>Indicates whether the requestor is capable of backing up
        and restoring portions of files. If no, then the writer should never
        generate PARTIAL_FILE or DIRECTED_RESTORE elements. Only
        entire files can be backed up or restored.</description>
  </AttributeType>
  <attribute type="version" />
  <attribute type="selectComponents" />
  <attribute type="bootableSystemStateBackup" />
  <attribute type="backupType" />
  <attribute type="partialFileSupport" />
  <element type="WRITER_COMPONENTS" />
  <element type="SNAPSHOT_SET_DESCRIPTION" minOccurs="0"
      maxOccurs="1" />
  </ElementType>
- <ElementType name="WRITER_COMPONENTS" content="eltOnly" model="closed"
      order="many">
    <description>Components that are backed up and restored that are
        associated with a specific writer instance</description>
    <attribute type="writerId" />
    <attribute type="instanceId" />
    <element type="COMPONENT" />
  </ElementType>
- <ElementType name="COMPONENT" content="eltOnly" model="open"
      order="many">
  - <AttributeType name="backupSucceeded" dt:type="enumeration"
        dt:values="yes no" default="no">
      <description>Indication of whether the component was backed up
          successfully or not. This should be set during the BackupComplete
          notification</description>
    </AttributeType>
  - <AttributeType name="componentType" dt:type="enumeration"
        dt:values="database filegroup">
      <description>Indication of whether component is database or file
          group</description>
    </AttributeType>
  - <AttributeType name="backupStamp" dt:type="string" required="no">
      <description>This string attribute contains the identifier assigned to
          the backup by the writer. The attribute is set by the writer either
          during the PrepareBackup or PostSnapshot event.</description>
    </AttributeType>
  - <AttributeType name="previousBackupStamp" dt:type="string"
        required="no">
      <description>In the case of an incremental or differential backup, this
          identifies the backup from which differences are compouted. This
          attribute is set by the requestor prior to the PrepareBackup
          event.</description>
    </AttributeType>
  - <AttributeType name="selectedForRestore" dt:type="enumeration"
        dt:values="yes no" default="no">
      <description>This yes/no attribute is set by the request prior to
          calling PreRestore and indicates whether the component is being
          restored or not.</description>
    </AttributeType>
  - <AttributeType name="additionalRestores" dt:type="enumeration"
        dt:values="yes no" default="no">
      <description>This yes/no attribute is set by the requestor prior to
          calling PreRestore and indicates whether additional restores of
          the component will follow (i.e., ull restore followed by log
          restores</description>
    </AttributeType>
  - <AttributeType name="restoreTarget" dt:type="enumeration"
        dt:values="original alternate new directed" default="original">
      <description>This enumerated attribute is set by the writer during
          PreRestore and indicates whether the files for the component
          should be restored to their original location, alternate location (as
          expressed by ALTERNATE_LOCATION_MAPPING elements in the
          metadata), new location (as expressed by RESTORE_TARGET
          elements created by the writer) or should be partially restored
          (as expressed by the DIRECTED_TARGET element created by the
          writer.</description>
    </AttributeType>
  - <AttributeType name="preRestoreFailureMsg" dt:type="string"
        required="no">
```

APPENDIX B-continued

EXEMPLARY BACKUP COMPONENTS DOCUMENT

```
        <description>This attirbute is set by the writer during the PreRestore
            event if the preRestore operation failed for some reason. It gives
            a textual description of why the preRestore failed.</description>
    </AttributeType>
-   <AttributeType name="filesRestored" dt:type="enumeration" dt:values="none
        all failed" default="all">
        <description>This attribute is set by the requestor after restoring files
            for the component (i.e., between the PreRestore and PostRestore
            events). Yes indicates that the files were restored successfully;
            no indicates that the files were not restored and the original files
            are intact; failed indicates that the original files were partially
            overwritten and are therefore corrupt. Note that the failed status
            can only occur in the situation of a restore of a file where only
            part of the data is restored (DIRECTED_RESTORE) or where only
            part of a file is backed up and restored (e.g., as part of a
            differential backup). In these cases a failed restore occurs if some
            of the data to be restored is written to the file but not all. In this
            case, the original copy of the file no long exists and the copy on
            tape is not complete and therefore cannot be used to create a
            consistent copy. The only option is to use a previous full backup
            to restore the data. Note that the "failed" indication can be used
            to indicate that some, but no all of the files of a component were
            restored. The requestore is required to either restore all the files
            of a component or none of the files. However, there are situations
            where this is not possible, and the restoration of a component has
            failed, but cannot be completely undone.</description>
    </AttributeType>
-   <AttributeType name="postRestoreFailureMsg" dt:type="string"
            required="no">
        <description>This string attribute is set by the writer during the
            PostRestore event. It is a text message indicating why the restore
            failed.</description>
    </AttributeType>
-   <AttributeType name="backupOptions" dt:type="string" required="no">
        <description>This is a private string passed between the requestor
            and the writer to control the backup of the component. It should
            be set by the requestor prior to the PrepareBackup
            event.</description >
    </AttributeType>
-   <AttributeType name="restoreOptions" dt:type="string" required="no">
        <description>This is a private string passsed between to requestor
            and the writer to control the restore of a component. It should be
            set by the requestor prior to the PreRestore event.</description>
    </AttributeType>
    <attribute type="componentType" />
    <attribute type="logicalPath" />
    <attribute type="componentName" />
    <attribute type="backupSucceeded" />
    <attribute type="backupOptions" />
    <attribute type="restoreOptions" />
    <attribute type="backupStamp" />
    <attribute type="previousBackupStamp" />
    <attribute type="selectedForRestore" />
    <attribute type="additionalRestores" />
    <attribute type="restoreTarget" />
    <attribute type="preRestoreFailureMsg" />
    <attribute type="filesRestored" />
    <attribute type="postRestoreFailureMsg" />
    <element type="ALTERNATE_LOCATION_MAPPING" minOccurs="0"
        maxOccurs="*" />
    <element type="BACKUP_METADATA" minOccurs="0" maxOccurs="1" />
    <element type="RESTORE_METADATA" minOccurs="0" maxOccurs="1" />
    <element type="RESTORE_TARGET" minOccurs="0" maxOccurs="*" />
    <element type="DIRECTED_TARGET" minOccurs="0" maxOccurs="*" />
    <element type="PARTIAL_FILE" minOccurs="0" maxOccurs="*" />
    <element type="RESTORE_SUBCOMPONENT" minOccurs="0" maxOccurs="*"
        />
</ElementType>
-   <ElementType name="ALTERNATE_LOCATION_MAPPING" content="empty"
        model="closed">
    <description>Mapping from a location that was backed up to a location to
        restore to.</description>
    <attribute type="path" />
    <attribute type="filespec" />
```

APPENDIX B-continued

EXEMPLARY BACKUP COMPONENTS DOCUMENT

```
      <attribute type="recursive" />
      <attribute type="alternatePath"/>
   </ElementType>
   <ElementType name="BACKUP_METADATA" content="empty" model="closed">
      <description>Default metadata element for backup. Content is a binary hex
         string. Note that the writer can store whatever he wants in the
         component. This is just a simple default mechanism.</description>
      <AttributeType name="metadata" dt:type="string" required="yes">
         <description>Metadata to be passed on restore</description>
      </AttributeType>
      <attribute type="metadata" />
   </ElementType>
   <ElementType name="RESTORE_METADATA" content="empty" model="closed">
      <description>Default metadata element for passing information from the
         writer's PreRestore event to the writer's PostRestore event. The data is
         opaque to the requestor.</description>
      <AttributeType name="metadata" dt:type="string" required="yes">
         <description>Metadata to be passed from PreRestore to
            PostRestore.</description>
      </AttributeType>
      <attribute type="metadata" />
   </ElementType>
   <ElementType name="RESTORE_TARGET" content="empty" model="closed">
      <description>This element in a COMPONENT should be supplied if the value
         of the restoreTarget attribute of the COMPONENT is "new". It supplies
         a mapping from a the original location of the file to the location where
         the file should be restored. There may be multiple RESTORE_TARGET
         elements within a component.</description>
      <attribute type="path" />
      <attribute type="filespec" />
      <attribute type="recursive" />
      <attribute type="alternatePath" />
   </ElementType>
   <ElementType name="DIRECTED_TARGET" content="empty" model="closed">
      <description>This element in a COMPONENT should be should be supplied if
         the value of the restoreTarget attribute of the COMPONENT is
         "directed". It is intended to support partial restoration of files or
         potentially how files should be reorganized upon restore. There may be
         multiple DIRECTED_TARGET elements within a
         component.</description>
      <AttributeType name="targetPath" dt:type="string" required="no">
         <description>This is the target location of the file that is to be written
            by the requestor. If this attribute is not specified then the
            targetPath is assumed to be the same as the original
            path.</description>
      </AttributeType>
      <AttributeType name="targetFilespec" dt:type="string" required="no">
         <description>This is the name of the file that is to be written by the
            requestor. If this is not specified then the target filename is
            assumed to be the same as the original file name. Note that if
            both the targetPath and targetFilespec are not specified then the
            original file is overwritten.</description>
      </AttributeType>
      <AttributeType name="sourceRanges" dt:type="string" required="yes">
         <description>This is a string of the form (offset:cb ...) where each
            offset is the byte offset to start reading data and cb is the length
            of the data to be read (each is a 64 bit integer). The ranges may
            not overlap and must be monotonically increasing.</description>
      </AttributeType>
      <AttributeType name="targetRanges" dt:type="string" required="yes">
         <description>This is a string of the form (offset:cb ...) where each
            offset is the byte offset to start wrting data and cb is the length of
            the data to be written (each is a 64 bit integer). The ranges may
            not overlap and must be monotonically increasing.</description>
      </AttributeType>
      <attribute type="path" />
      <attribute type="filespec" />
      <attribute type="targetPath" />
      <attribute type="targetFilespec" />
      <attribute type="sourceRanges" />
      <attribute type="targetRanges" />
   </ElementType>
   <ElementType name="PARTIAL_FILE" content="empty" model="closed">
      <description>This element in a COMPONENT is supplied by the writer during
         the PostRestore event. It indicates that only a portion of the file should
         be backed up. There may be multiple PARTIAL_FILE elements within a
         single COMPONENT.</description>
```

APPENDIX B-continued

EXEMPLARY BACKUP COMPONENTS DOCUMENT

```
- <AttributeType name="ranges" dt:type="string" required="no">
    <description>This range list has the form (offset:length ...) where
      offset is the byte offset in the file to be backed up and length is
      the length of the data to be backed up. Both are 64 bit integers.
      The ranges must be monotonically increasing and must not
      overlap. If the rangelist is not specified then the entire file should
      be backed up.</description>
  </AttributeType>
- <AttributeType name="metadata" dt:type="string" required="no">
    <description>This is metadata used by the writer for restoring the
      partial backup. It might for example, include the total size of the
      file to be restored.</description>
  </AttributeType>
  <attribute type="path" />
  <attribute type="filespec" />
  <attribute type="ranges" />
  <attribute type="metadata" />
  </ElementType>
- <ElementType name="RESTORE_SUBCOMPONENT" content="empty"
    model="closed">
    <description>This element in a COMPONENT is added by the requestore
      prior to the PreRestore event. It allows a subcomponent of a backed up
      component to be restored.</description>
- <AttributeType name="repair" dt:type="enumeration" dt:values="yes no"
    default="no">
    <description>This indicates that the purpose of the restore is to repair
      one or more files of the component. The writer is responsible for
      identifying what is to be restored using a DIRECTED_TARGET
      element.</description>
  </AttributeType>
  <attribute type="logicalPath" />
  <attribute type="componentName" />
  <attribute type="repair" />
  </ElementType>
- <ElementType name="SNAPSHOT_SET_DESCRIPTION" content="eltOnly"
    model="closed">
    <description>This describes a snapshot, including the snapshot set id as
      well as the volume information for the snapshotted
      volumes</description>
- <AttributeType name="snapshotSetId" dt:type="uuid" required="yes">
    <description>this is the unique identifier for the
      snapshot</description>
  </AttributeType>
- <AttributeType name="context" dt:type="ui4" required="yes">
    <description>this is the context used to create the
      snapshot</description>
  </AttributeType>
- <AttributeType name="metadata" dt:type="string" required="no">
    <description>this is private metadata about the snapshot
      set</description>
  </AttributeType>
- <AttributeType name="description" dt:type="string" required="no">
    <description>this is a user description of the snapshot</description>
  </AttributeType>
  <attribute type="snapshotSetId" />
  <attribute type="context" />
  <attribute type="description" />
  <attribute type="metadata" />
  <element type="SNAPSHOT_DESCRIPTION" minOccurs="0" maxOccurs="*" />
  </ElementType>
- <ElementType name="SNAPSHOT_DESCRIPTION" content="eltOnly"
    model="closed">
    <description>This is the description of a snapshotted volume</description>
- <AttributeType name="snapshotId" dt:type="uuid" required="yes">
    <description>This is the unique id of the snapshotted
      volume</description>
  </AttributeType>
- <AttributeType name="originatingMachine" dt:type="string" required="yes">
    <description>This is the machine where the original volume was
      snapshotted</description>
  </AttributeType>
- <AttributeType name="originalVolumeName" dt:type="string" required="yes">
    <description>This is the original name of the volume.</description>
  </AttributeType>
```

APPENDIX B-continued

EXEMPLARY BACKUP COMPONENTS DOCUMENT

```
- <AttributeType name="snapshotAttributes" dt:type="ui4" required="yes">
    <description>this describes the actual snapshot attributes (as defined
        in VSS_VOLUME_SNAPSHOT_ATTRIBUTES)</description>
  </AttributeType>
- <AttributeType name="deviceName" dt:type="string" required="no">
    <description>This is the internal device name for the snapshotted
        volume. This can be used if the snapshot is not
        exposed.</description>
  </AttributeType>
- <AttributeType name="exposedName" dt:type="string" required="no">
    <description>This is the exposed name of the snapshot
        volume</description>
  </AttributeType>
- <AttributeType name="exposedPath" dt:type="string" required="no">
    <description>If only a subdirectory is exposed, this is the path to that
        subdirectory.</description>
  </AttributeType>
- <AttributeType name="providerId" dt:type="uuid" required="yes">
    <description>This is the provider that surfaced the
        snapshot</description>
  </AttributeType>
- <AttributeType name="timestamp" dt:type="ui8" required="yes">
    <description>this is when the snapshot set was created.</description>
  </AttributeType>
  <attribute type="snapshotId" />
  <attribute type="providerId" />
  <attribute type="snapshotAttributes" />
  <attribute type="originatingMachine" />
  <attribute type="originalvolumeName" />
  <attribute type="timestamp" />
  <attribute type="deviceName" />
  <attribute type="exposedPath" />
  <attribute type="exposedName" />
  <element type="LUN_MAPPING" minOccurs="0" maxOccurs="*" />
  </ElementType>
- <ElementType name="LUN_MAPPING" content="eltOnly" model="closed">
    <description>Actual mapping of source lun to a destination lun</description>
    <element type="SOURCE_LUN" minOccurs="1" maxOccurs="1" />
    <element type="DESTINATION_LUN" minOccurs="1" maxOccurs="1" />
    <element type="DISK_EXTENT" minOccurs="1" maxOccurs="*" />
  </ElementType>
- <ElementType name="DISK_EXTENT" content="empty" model="closed">
    <description>A particular disk extent on a LUN</description>
  - <AttributeType name="startingOffset" dt:type="ui8" required="yes">
      <description>starting offset of the extent in sectors</description>
    </AttributeType>
  - <AttributeType name="extentLength" dt:type="ui8" required="yes">
      <description>length of the extent in sectors</description>
    </AttributeType>
    <attribute type="startingOffset" />
    <attribute type="extentLength" />
  </ElementType>
- <ElementType name="SOURCE_LUN" content="eltOnly" model="closed">
    <description>The information for the lun on the originating
        volume</description>
    <element type="LUN_INFORMATION" />
  </ElementType>
- <ElementType name="DESTINATION_LUN" content="eltOnly" model="closed">
    <description>The information for the lun on the snapshotted
        volume</description>
    <element type="LUN_INFORMATION" />
  </ElementType>
- <ElementType name="INTERCONNECT_DESCRIPTION" content="empty"
        model="closed">
    <description>An interconnect address including the address
        type</description>
  - <AttributeType name="interconnectAddressType" dt:type="enumeration"
        dt:values="FCFS FCPH FCPH3 MAC" required="yes">
```

APPENDIX B-continued

EXEMPLARY BACKUP COMPONENTS DOCUMENT

```
        <description>interconnect address type. Describes type of the
           interconnect address stored in the interconnectAddress
           attribute</description>
     </AttributeType>
   <AttributeType name="port" dt:type="string" required="no">
        <description>Port through which the interconnect address is referred
           to. Note that the same device may have different interconnect
           addresses through different ports.</description>
     </AttributeType>
   <AttributeType name="interconnectAddress" dt:type="string" required="yes">
        <description>World Wide name or other interconnect address of the
           device</description>
     </AttributeType>
     <attribute type="interconnectAddressType" />
     <attribute type="port" />
     <attribute type="interconnectAddress" />
   </ElementType>
 <ElementType name="LUN_INFORMATION" content="eltOnly" model="closed">
     <description>enough of the location and name of the lun to transport it.
        TBD</description>
   <AttributeType name="busType" dt:type="enumeration" dt:values="Scsi Atapi
        Ata 1394 Ssa Fibre Usb RAID" required="yes">
        <description>Type of bus that the LUN is attached to</description>
     </AttributeType>
   <AttributeType name="deviceType" dt:type="ui1" required="yes">
        <description>SCSI-2 device type</description>
     </AttributeType>
   <AttributeType name="deviceTypeModifier" dt:type="ui1" required="yes">
        <description>SCSI-2 device type modifier (if any) - this may be
           0</description>
     </AttributeType>
   <AttributeType name="commandQueueing" dt:type="enumeration"
        dt:values="yes no" default="no">
        <description>Flag indicating whether the device can support mulitple
           outstanding commands. The actual synchronization in this case is
           the responsibility of the port driver.</description>
     </AttributeType>
   <AttributeType name="vendorId" dt:type="string" required="no">
        <description>Optional string identifying the vendor</description>
     </AttributeType>
   <AttributeType name="productId" dt:type="string" required="no">
        <description>Optional string identifying the product</description>
     </AttributeType>
   <AttributeType name="productRevision" dt:type="string" required="no">
        <description>Optional product revision information</description>
     </AttributeType>
   <AttributeType name="serialNumber" dt:type="string" required="no">
        <description>Optional serial number of the device</description>
     </AttributeType>
   <AttributeType name="diskSignature" dt:type="uuid" required="yes">
        <description>Disk signature or GUID. If a signature than all but the
           lower 32 bits of the GUID are 0.</description>
     </AttributeType>
   <AttributeType name="deviceIdentification" dt:type="string" required="yes">
        <description>UUENCODED binary for the device identification page as
           defined by the STORAGE_DEVICE_ID_DESCRIPTOR structure. This
           contains the vendor id, EUI-64 id, FC-PH name, and vendor
           specific data.</description>
     </AttributeType>
     <element type="INTERCONNECT_DESCRIPTION" minOccurs="0"
        maxOccurs="*" />
     <attribute type="deviceType" />
     <attribute type="deviceTypeModifier" />
     <attribute type="commandQueueing" />
     <attribute type="busType" />
     <attribute type="vendorId" />
     <attribute type="productId" />
     <attribute type="productRevision" />
     <attribute type="serialNumber" />
     <attribute type="diskSignature" />
     <attribute type="deviceIdentification" />
  </ElementType>
</Schema>
```

What is claimed is:

1. In a distributed computer network, a method of transporting data from a sending host computer system to a receiving host computer system, wherein the data is stored on a volume of information, the method comprising:
   creating a point-in-time copy of an entire volume;
   generating a backup components document, wherein the backup components document includes location information related to the point-in-time copy;
   importing the backup components document to the receiving host computer system; and
   accessing the point-in-time copy using the location information in the backup components document to transport the point-in-time copy to the receiving host computer system, wherein the act of creating the point-in-time copy of the volume comprises creating a point-in-time copy of one or more LUNs that have stored thereon a portion of the volume to be transported, and wherein the method of transporting data further comprises:
      identifying each of the point-in-time copies of the one or more LUNs;
      requesting information relating to each of the point-in-time copies of the one or more LUNs; and
      receiving identifying information related to each of the point-in-time copies of the one or more LUNs, wherein the identifying information is stored in the backup components document.

2. A method as defined in claim 1, wherein the backup components document comprises:
   a self-contained description of where the point-in-time copy resides and how the point-in-time copy is to be restored.

3. A method as defined in claim 2, wherein the backup components document further comprises:
   a description of physical resources necessary to restore and access the point-in-time copy.

4. A method as defined in claim 1, wherein the volume is one of a plurality of volumes stored on a plurality of logical unit numbers (LUNs), the method further comprising:
   identifying the plurality of volumes to be copied and transported;
   wherein the creating act comprises creating a point-in-time copy of the plurality of volumes;
   importing the point-in-time copy of the plurality of volumes onto the receiving host computer system; and
   reconstructing information relating to mapping information associated with the plurality of volumes to the point-in-time copy of the plurality of volumes.

5. A method as defined in claim 4, further comprising:
   following the act of identifying the plurality of volumes to be copied and transported and prior to the act of creating the point-in-time copy of the plurality of volumes, determining the plurality of LUNs that compose the plurality of volumes;
   polling a plurality of providers in the network environment to determine whether the plurality of LUNs that compose the plurality of volumes are supported;
   determining one provider that supports the plurality of LUNs that compose the plurality of volumes to create the point-in-time copy of the plurality of volumes; and
   instructing the provider that supports the plurality of LUNs that compose the plurality of volumes to create the point-in-time copy of the plurality of volumes.

6. A method as defined in claim 1, wherein the volume is stored on at least a portion of one or more LUNs, the method further comprising:
   marking portions of the one or more LUNs to identify the portions as being associated with the volume;
   creating a point-in-time copy of each of the one or more LUNs having a portion of the volume;
   evaluating the marked portions of the point-in-time copies of the one or more LUNs; and
   based on the evaluation act, hiding portions of the point-in-time copies of the one or more LUNs not associated with the volume.

7. A method as defined in claim 6, wherein the act of marking portions of the one or more LUNs to identify the portions as being associated with the volume marks the portions of the one or more LUNs as hidden or read-only and wherein, based on the evaluation act, only the portions of the point-in-time copies of the one or more LUNs associated with the volume are unhidden.

8. A method as defined in claim 6, wherein the act of marking portions of the one or more LUNs to identify the portions as being associated with the volume marks all volumes on the one or more LUNs as hidden or read only and based on the evaluation act, only the portions of the point-in-time copies of the one or more LUNs associated with the volume are unhidden.

9. A method as defined in claim 1, wherein the volume is stored on at least a portion of one or more LUNs, the method further comprising:
   storing the original state of portions of the one or more LUNs to be copied;
   opening a volume handle to allow marking of the volume;
   marking portions of the one or more LUNs to identify the portions as being associated with the volume;
   creating the point-in-time copy of each of the one or more LUNs having a portion of the volume;
   closing the volume handle; and
   restoring the volume to its original state.

10. A method as defined in claim 9, wherein the act of closing the volume handle is caused by a system crash.

11. A method as defined in claim 9, wherein the backup components document comprises an XML document.

12. A method as defined in claim 1, wherein a hardware provider creates the point-in-time copies of the one or more LUNs and provides the identifying information.

13. A method as defined in claim 1, wherein the backup components document comprises an XML document.

14. A method as defined in claim 1, wherein the volume is one of a plurality of volumes associated with a plurality of LUNs, the act of creating the point-in-time copy of the volume comprising creating a point-in-time copy of each of the plurality of volumes, and wherein the method further comprises:
   requesting the deletion of one point-in-time copy of one of the plurality of volumes; and
   deleting one of the point-in-time copies of one of the plurality of volumes while maintaining at least one other point-in-time copy of one of the plurality of volumes.

15. A method as defined in claim 14, wherein the method further comprises:
   in response to the request to delete one of the point-in-time copies of one of the plurality of volumes, evaluating the point-in-time copy of each of the plurality of volumes to determine which point-in-time copies of the plurality of volumes would remain following deletion of the one point-in-time copy;

determining which LUNs are associated with the point-in-time copy to be deleted;

for each LUN that is associated with the point-in-time copy to be deleted, determining whether the LUN is used by another point-in-time copy corresponding to another one of the plurality of volumes; and if the LUN is not used by another point-in-time copy corresponding to another one of the plurality of volumes, freeing the LUN.

16. A computer program product readable by a computer and encoding instructions for executing the method recited in claim 15.

17. A computer program product readable by a computer and encoding instructions for executing the method recited in claim 1.

* * * * *